US012785404B2

(12) United States Patent
Manohar et al.

(10) Patent No.: US 12,785,404 B2
(45) Date of Patent: Nov. 3, 2026

(54) RECONNECTION CONTROL APPARATUS AND POWER SYSTEM

(71) Applicant: Mitsubishi Electric Corporation, Tokyo (JP)

(72) Inventors: Rutvikanandan Manohar, Tokyo (JP); Sadayuki Inoue, Tokyo (JP); Koki Matsumoto, Tokyo (JP); Yasuhiro Kojima, Tokyo (JP); Keishi Matsuda, Tokyo (JP); Masanobu Koshio, Tokyo (JP); Ken Kurose, Tokyo (JP); Yu Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/149,927

(22) PCT Filed: Mar. 16, 2023

(86) PCT No.: PCT/JP2023/010362
§ 371 (c)(1),
(2) Date: Jul. 22, 2025

(87) PCT Pub. No.: WO2024/189908
PCT Pub. Date: Sep. 19, 2024

(65) Prior Publication Data
US 2026/0229896 A1 Aug. 6, 2026

(51) Int. Cl.
*H02J 3/38* (2026.01)
*H02J 3/001* (2026.01)

(52) U.S. Cl.
CPC ................ *H02J 3/38* (2013.01); *H02J 3/001* (2020.01)

(58) Field of Classification Search
CPC ................. H02J 3/38; H02J 3/00; H02J 3/001
See application file for complete search history.

(56) References Cited

U.S. PATENT DOCUMENTS

2022/0261026 A1* 8/2022 Karlgaard ............... H02J 3/381
2023/0077967 A1* 3/2023 Martinez ............. G05B 19/042
700/89

FOREIGN PATENT DOCUMENTS

JP 2009-225599 A 10/2009
JP 2021-151145 A 9/2021
(Continued)

OTHER PUBLICATIONS

International Search Report and Written Opinion mailed on May 16, 2023, received for PCT Application PCT/JP2023/010362, filed on Mar. 16, 2023, 9 pages.
(Continued)

*Primary Examiner* — Robert L Deberadinis
(74) *Attorney, Agent, or Firm* — XSENSUS LLP

(57) ABSTRACT

A reconnection control apparatus controls a switch disposed between at least one DER system having droop characteristics and a power grid. The reconnection control apparatus comprising a first detecting unit to detect first phase, frequency and amplitude of a voltage on a side of the DER system of the switch a second detecting unit to detect second phase, frequency and amplitude of a voltage on a side of the power grid of the switch and a reconnection control unit to reconnect the DER system to the power grid by outputting power reference and voltage reference signals to the DER system to match the first phase, frequency and amplitude to the second phase, frequency and amplitude and closing the switch based on a difference between the first phase and the second phase and a difference between the first absolute and the second absolute.

15 Claims, 23 Drawing Sheets

(56) References Cited

FOREIGN PATENT DOCUMENTS

| | | |
|---|---|---|
| JP | 2022-032632 A | 2/2022 |
| JP | 2022-037475 A | 3/2022 |

OTHER PUBLICATIONS

Noro et al., "Proposal of Inverter Control Method for Electric Power System Consisting of Energy Storages", IEEJ Transactions on Power and Energy, vol. 138, No. 11, 2018, pp. 854-861 (10 pages including English Abstract).

Sato et al., "Control method for the stable operation of distributed inverters following the introduction of large-scale renewable energy to a remote island grid" Clean Energy, vol. 5, Issue 2, 2021, pp. 196-207.

* cited by examiner

RECONNECTION CONTROL APPARATUS AND POWER SYSTEM

CROSS-REFERENCE TO RELATED APPLICATION

This application is a national stage application, pursuant to 35 U.S.C. § 371, of International Patent Application No. PCT/JP2023/010362, filed Mar. 16, 2023, the entire contents of which are incorporated herein by reference.

TECHNICAL FIELD

The present disclosure relates to an apparatus for reconnection of an independently operating distributed energy resource to the commercial power grid after clearing of a fault.

BACKGROUND ART

In recent years, distributed energy resources (hereafter referred to as DERs) are promoted as a means for decarbonization. It is possible to utilize DER equipped with storage batteries, thus combining energy generation and storage to operate independently from the commercial power grid (hereafter referred to as "power grid") in the case of power outages such as black outs, accidents, faults, and natural disasters. The DERs usually include inverters connected to a DC source of power such as solar or batteries, comprising power conditioners and control circuits as well as synchronous generators. Due to the increase in the amount of renewable energy integrated into the power grid through static inverters, the inertial properties of the power grid are decreased, thus affecting the overall stability of the grid. To restore the inertia in the power grid, grid forming inverter technology such as virtual synchronous generators is proposed. Virtual synchronous generators give static inverters characteristics of synchronous generators by using the storage batteries to supply or absorb inertial power, thereby securing grid stability.

The DER power supply system with one or more DERs and one or more multiple grid forming energy sources operates independently by disconnecting from the power grid through opening of a switch. Such DER power supply system will be referred to as "DER system" hereafter. The DER system needs to be re-connected to the grid when the fault is eliminated or the power is restored (hereafter referred to as "power is restored") and a normal grid-connected operation is desired. To ensure safe reconnection it is desirable to synchronize the frequency, the phase, and the amplitude of the voltage of the DER system to those of the power grid.

To solve the above problems various methods for synchronization of frequency and voltage have been suggested. In Japanese Patent Laying-Open No. 2022-037475 a method to synchronize the frequency and the amplitude of the voltage of the independently operating DER system to the frequency and the amplitude of the voltage of the power grid before reconnection is disclosed.

CITATION LIST

Patent Literature

[PTL 1] Japanese Patent Laying-Open No. 2022-037475

SUMMARY OF INVENTION

Technical Problem

The microgrid system (DER system) described in Japanese Patent Laying-Open No. 2022-037475 is electrically separated from the power grid through a switch. When disconnected, the frequency and the amplitude of the voltage of the DER system differ from the frequency and amplitude of the voltage of the power grid. The patent describes a method to synchronize the frequency and amplitude of the voltage of the DER system to the frequency and amplitude of the voltage of the power grid. The method includes that a measuring device placed at the switch to measures the active powers, reactive powers, frequencies and amplitudes of the voltages of both the power grid and the DER system. Through this measurement the reactive power and active power of the DER system are adjusted to the reactive power and active power of the power grid respectively and the frequency and amplitude of the voltage of the DER system are adjusted to the frequency and amplitude of the voltage of the power grid respectively.

However, the above idea presents the following problems. A method to adjust the phase of the voltage of the DER system to the phase of the voltage of the grid is not described. For the safe reconnection of the DER system to the grid, it is necessary to match the phase of the voltage of the DER system to the phase of the voltage of the power grid. The patent document Japanese Patent Laying-Open No. 2022-037475 does not provide a method to control the phase of the voltage of the DER system so that the phase of the voltage of the DER system matches the phase of the voltage of the power grid for safe reconnection.

The present disclosure is made to solve the above-mentioned issues and the purpose of the present disclosure is to propose a method to synchronize the amplitude, the phase and the frequency of the output voltage of the DER system to the amplitude, the phase and the frequency of the output voltage of the power grid before reconnection and initiate a sequence to close the switch when the necessary conditions are satisfied. The phase and frequency of the voltage are adjusted by adjusting a power reference of the one or multiple DER units with grid forming or droop characteristics.

Solution to Problem

In order to solve the above-mentioned problems, a reconnection control apparatus of the present disclosure comprises two detectors, one on each side of the reconnection switch to measure the phase, the frequency and the amplitude of the output voltage on the DER system side and the phase, the frequency and the amplitude of the voltage on the grid side. The information from these detecting units is received by the reconnection control unit which comprises a power control unit and a voltage adjustment unit as well as a switching unit. The switching unit closes the switch when the phase, the frequency and the amplitude of the output voltage of the DER system match the phase, the frequency and the amplitude of the power grid. The power control unit receives information of the phases and the frequencies on both sides of the switch and outputs a command signal to adjust the phase and the frequency of the DER system by changing the power reference and a switch signal to the switching unit. The power control unit first calculates the power reference through phase matching control carried out by the phase control unit by generating a power reference signal to change the frequency of the output voltage of the DER system to achieve accelerated phase matching. When the phase difference is within a given threshold, hereby referred to as a first threshold, the control is shifted to frequency matching control, which generates a power reference to now match the frequency of the output voltage of the DER system to the frequency of the voltage of the power grid. As the frequency is matched, the phase difference is reduced and when the phase difference is within a given threshold, hereafter referred to as a second threshold, the power control unit sends a signal (F-P signal) to the switching unit to close the switch. The voltage control unit controls the amplitude of the output voltage of the DER to match the amplitude of the output voltage of the DER to the amplitude of the voltage of the power grid and as the voltage is matched, sends a signal (V signal) to the switching unit. When the switching unit receives the F-P signal and V signal, the switch is closed.

Advantageous Effects of Invention

According to the present disclosure, the reconnection of a DER system comprising of one or multiple units with grid forming characteristics to the power grid after disconnection due to a fault or after abnormal circumstances is carried out after matching the phase, the frequency and the amplitude of the output voltage of the DER system to the phase, the frequency and the amplitude of the voltage of the power grid and ensure safe reconnection, without affecting the output power supplied by the DER system to the load. As the phase, the frequency and the amplitude of the output voltage of DER system is matched to the frequency and the amplitude of the output voltage of the power grid, the reconnection to the power grid after power recovery becomes seamless, thus eliminating system disturbance. The voltage supplied to the domestic/commercial loads remains uninterrupted, thus maintaining the quality of the voltage as well as the frequency.

DESCRIPTION OF EMBODIMENTS

First Embodiment

First, a configuration example of a DER system to which an apparatus for safe reconnection according to the first embodiment is applied will be described. Although a three-phase system is exemplified in the first embodiment, the DER system may be single phase.

Configuration

Figure 1:
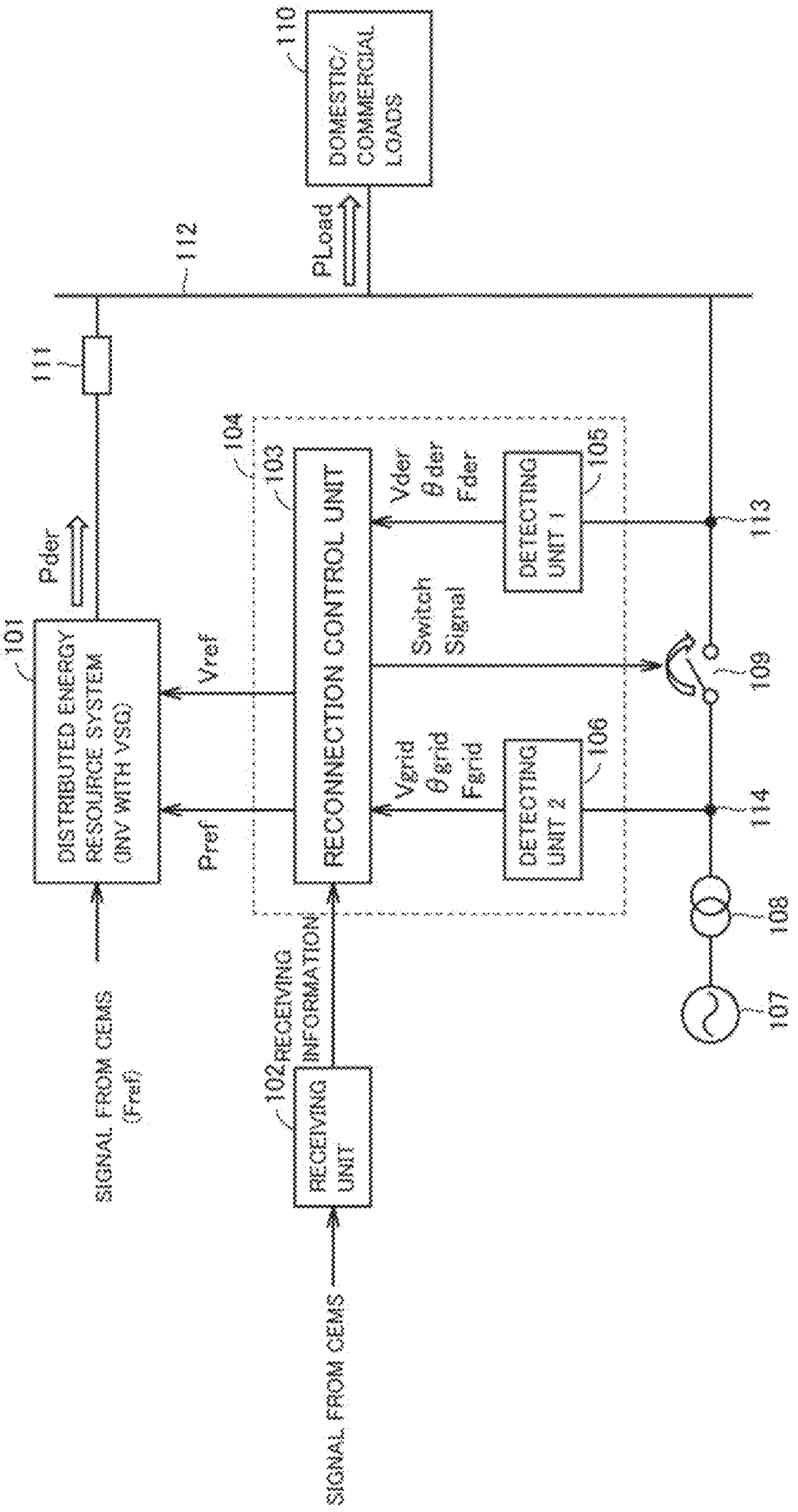
FIG. 1 is a block diagram that shows the entire system with reference to the first embodiment.

FIG. 1 is a block diagram that shows a complete structure of the first embodiment. A distributed energy resource system (DER system) 101 normally connected to a power grid 107 and supplying power to domestic and commercial loads 110 is shown in FIG. 1. The DER system 101 is connected to the power grid 107 through a switch 109. The DER system 101 is configured to have energy generation/energy storage units such that, in the event of power outages or malfunction in the operation of the power grid 107, the DER system 101 supplies power to the domestic and/or commercial loads 110 independently. The DER system 101 is connected to a power distribution system 112 through a distribution impedance 111. The power distribution system 112 connects the power grid 107 or the DER system 101 to the domestic and/or commercial loads 110. The domestic and/or commercial loads 110 will be referred to as "domestic/commercial loads" hereafter. The DER system 101 receives control information from a Central Energy Management System (CEMS) 116 that is a higher order DER system controller which gives the control information to the DER system 101. For the first embodiment, the CEMS 116 is considered to be physically placed at the same location (site) as a reconnection control apparatus 104.

When the malfunction/fault in the power grid 107 is cleared, it is desirable that the independently functioning DER system 101 is reconnected to the power grid 107 through the switch 109. During the time of the reconnection, the reconnection control apparatus 104 detects the phase, the frequency and the amplitude of the voltage at point 113 on the DER system-side of the switch 109 as well as the phase, the frequency and the amplitude of the voltage at point 114 on the power grid-side of the switch 109. The reconnection control apparatus 104 gives a signal to close the switch 109 when the phase, the frequency and the amplitude of voltages on either side of the switch 109 are within a predetermined threshold. The reconnection control apparatus 104 also receives the control information from the CEMS 116 through a receiving unit 102.

During normal operating conditions, the power grid 107 is connected to the domestic/commercial loads 110 and the DER system 101 through a distribution transformer 108 via the switch 109. When the switch 109 is open, the DER system 101 works in an independent operation mode and when the switch 109 is closed, the DER system 101 is connected to the power grid 107 and performs a grid-connected operation.

In the independent operation mode, the DER system 101 supplies power to the domestic/commercial loads 110 through the power distribution system 112. The DER system 101 is connected to the power distribution system 112 through the distribution impedance 111, which is composed of a reactor component and a resistance component.

Figure 2:
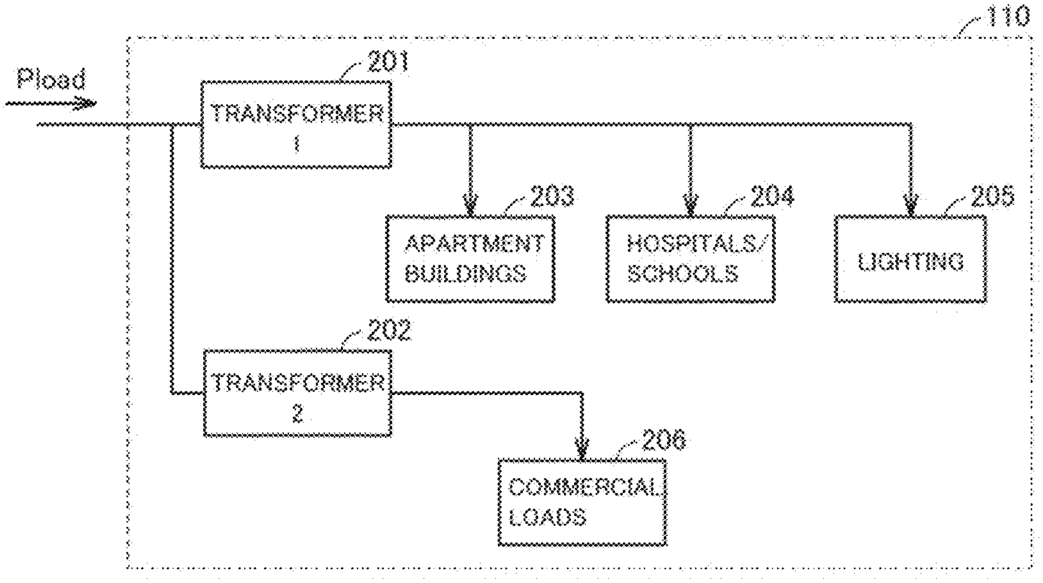
FIG. 2 is a block diagram that shows an example of the domestic/commercial loads supplied by the DER system.

The independent operation is desired during power outages, natural disasters or blackouts caused by faults in the power grid 107. FIG. 2 shows a general description of the domestic/commercial loads 110. The domestic/commercial loads 110 comprise a first transformer 201, a second transformer 202. The domestic/commercial loads 110 are connected to the DER system 101 through the first transformer 201 and the second transformer 202. During the independent operation the domestic loads 110 supplied by the DER system 101 may include hospitals and schools 204, street lighting 205 and even apartment buildings 203. The DER system 101 may also supply power to commercial loads 206.

The DER system 101 according to the first embodiment comprises a single DER unit that actively controls the amplitude and the frequency of the output voltage through grid forming control, i.e a grid-forming control. The DER system 101 receives the control information from the CEMS 116.

The DER system 101 can consist of a single or multiple DERs with grid-forming control and a single or multiple DERs with grid following control, but the explanation for multiple DERs is omitted in the first embodiment.

Figure 3:
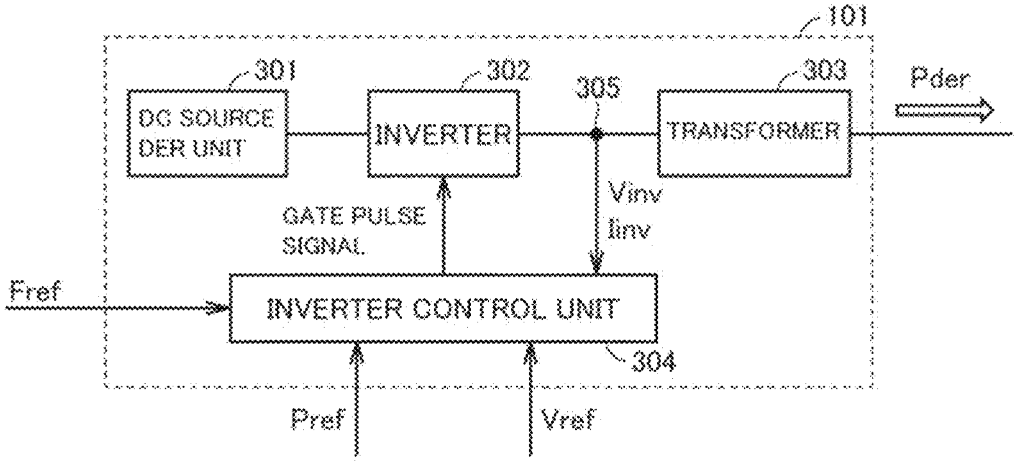
FIG. 3 is a block diagram of the typical DER system as shown in FIG. 1 with respect to the first embodiment.

FIG. 3 gives the general configuration of the DER system 101 for the first embodiment consisting of a single DER. The DER system 101 comprises a DER with DC source 301, an inverter 302, a third transformer 303, an inverter control unit 304, and a current and voltage detector 305.

The DER with DC source 301 comprises a DER such as solar energy or battery storage system which supplies DC voltage. The DER with DC source 301 is connected to the inverter 302 which is a power electronic inverter circuit that converts the DC voltage into a desired AC voltage. The inverter 302 comprises semiconductor switches such as field effect transistors (FET) and controlled by a gate pulse signal. The AC voltage output from the inverter 302 is stepped up to match the AC voltage of the power distribution system 112 by the third transformer 303. Thus, the inverter 302 is connected to the power distribution system 112 through the third transformer 303.

The inverter control unit 304 receives a value of AC current of the inverter and a value of voltage of the inverter 302 (Vinv,Inv) as detected by the current and voltage detector 305. The current detected by the current and voltage detector 305 will be referred to as "inverter current (Iinv)" and the voltage detected by current and voltage detector 305 will be referred to as "inverter voltage (Vinv)".

The inverter control unit 304 also receives a power reference signal (Pref) and a voltage reference signal (Vref) from the reconnection control apparatus 104 and a frequency reference signal (Fref) from the CEMS 116. In the first embodiment, the DER system 101 receives the value of the frequency reference signal (Fref), which is usually set to the operating frequency of the power grid 107. Based on the frequency reference signal (Fref), the power reference signal (Pref) and the voltage reference signal (Vref), the inverter control unit 304 controls the phase, the frequency and the amplitude of the voltage of the inverter 302 through the gate pulse signal.

Figure 4:
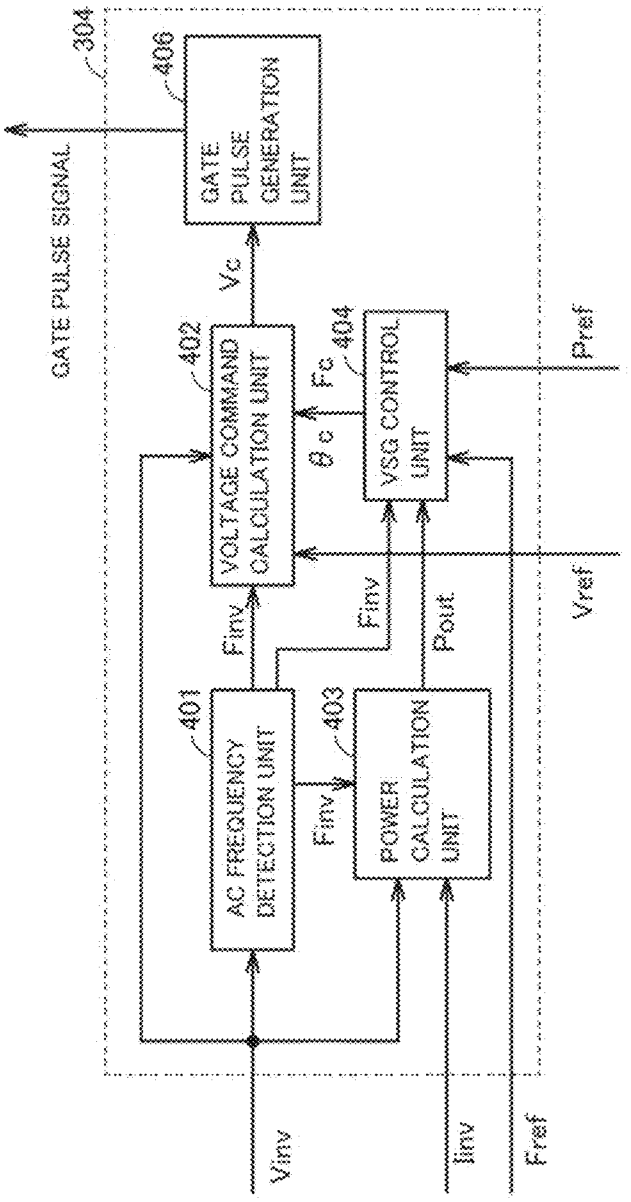
FIG. 4 is a block diagram describing inverter control unit shown in FIG. 3 with reference to the first embodiment.

The inverter control unit 304 with reference to the first embodiment is given FIG. 4. The inverter control unit 304 comprises an AC frequency detecting unit 401, a voltage command calculation unit 402, a power calculation unit 403 and a VSG control unit 404, and a gate pulse generation unit 406.

The AC frequency detecting unit 401 receives the inverter voltage (Vinv) and detects its frequency. The frequency of the inverter voltage (Vinv) detected by the AC frequency detecting unit 401 will be referred to as "inverter frequency (Finv)". The inverter frequency (Finv) is sent to the voltage command calculation unit 402, the power calculation unit 403 and the VSG control unit 404.

The power calculation unit 403 receives the inverter current (Iinv), the inverter voltage (Vinv) and the inverter frequency (Finv) and calculates a power output (Pout) of the inverter 302. The power output (Pout) calculated by the power calculation unit 403 is given to the VSG control unit 404.

The VSG Control unit 404 receives the power output (Pout) from the power calculation unit 403, the inverter frequency (Finv) from the AC frequency detecting unit 401. The VSG control unit 404 also receives the frequency reference signal (Fref) from the CEMS 116, and the power reference signal (Pref) from the reconnection control apparatus 104. The VSG control unit 404 calculates a phase command value (c) and a frequency command value (Fc) to be sent to the voltage command calculation unit 402 based on the inverter frequency (Finv), the frequency reference signal (Fref), the power output (Pout), and the power reference signal (Pref).

The voltage command calculation unit 402 is a voltage controller which receives the inverter voltage (Vinv) from the current and voltage detector 305, the inverter frequency (Finv) from the AC frequency detecting unit 401, the phase command value (θc) and the frequency command value (Fc) from the VSG control unit 404 and the voltage reference signal (Vref) from the reconnection control apparatus 104. The voltage command calculation unit 402 calculates the sinusoidal voltage command value (Vc) to be given to the gate pulse generation unit 406. The amplitude of the voltage command value (Vc) is based on a controller, which may be a PI controller that controls the amplitude of inverter voltage (Vinv) to match the amplitude of inverter voltage (Vinv) to the voltage reference signal (Vref) and the phase and the frequency of the voltage command value (Vc) is given by the phase command value (θc) and the frequency command value (Fc).

The gate pulse generation unit 406 calculates a gate pulse signal to be sent to the inverter 302 based on the voltage command value (Vc).

Figure 5:
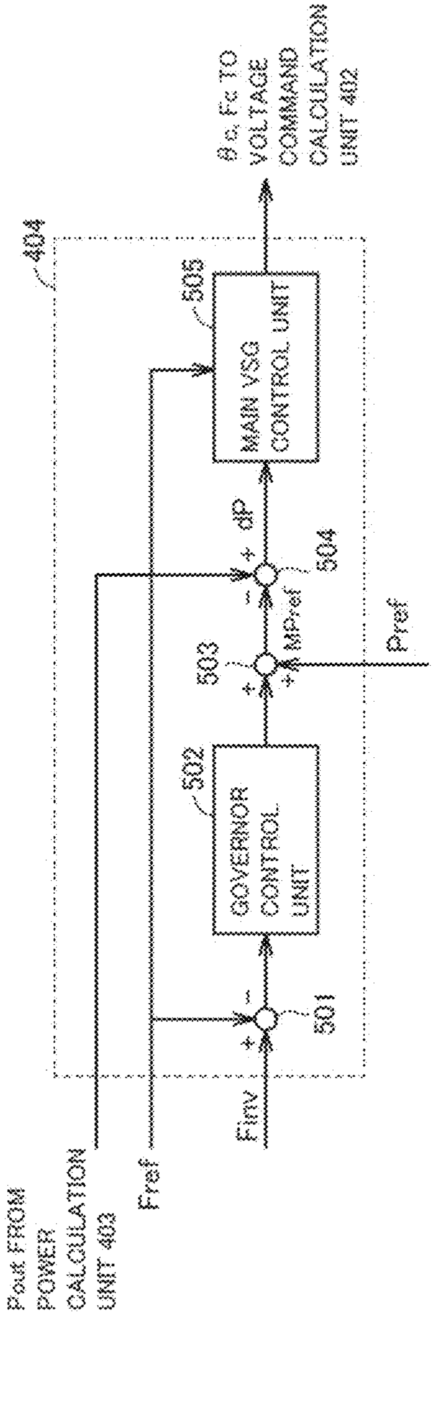
FIG. 5 is a block diagram describing the structure of the VSG control unit shown in FIG. 4.

The general configuration of the VSG control unit 404 is given by FIG. 5. The VSG control unit 404 comprises a subtractor 501, a governor control unit 502, an addition circuit 503, a subtractor 504, and a main VSG control unit 505.

The subtractor 501 calculates the difference between the inverter frequency (Finv) and the frequency reference signal (Fref). The output of the subtractor 501 is given to the governor control unit 502. The governor control unit 502 acts as a governor and generates an offset value to be added to the power reference signal (Pref) based on the output of the subtractor 501. The offset value is added to the power reference signal (Pref) by the addition circuit 503 generating a modified power reference signal (MPref). The subtractor 504 calculates a difference (dP) between the output power of the inverter (Pout) as received from the power calculation unit 403 and the modified power reference signal (MPref) from the addition circuit 503 and sends it to the main VSG control unit 505. The main VSG control unit 505 calculates the phase command value (θc) and the frequency command value (Fc) based on the principles of virtual synchronous generator, such that the difference between frequency reference signal (Fref) and the frequency command value (Fc) is dependent on the difference (dP) between the modified power reference signal (MPref) and the output power of the inverter (Pout). The phase command value (θc) is calculated based on the frequency command value (Fc). The detailed working of the governor control unit 502 and the main VSG control unit 505 will be described later.

As shown in FIG. 1, the reconnection control apparatus 104 receives the phase, frequency and amplitude information of the AC voltage at point 113 on the DER system-side of the switch 109, and the phase, frequency and amplitude information of the voltage at point 114 on the power grid-side of the switch 109. The reconnection control apparatus 104 also receives the receiving information from the receiving unit 102, as "signal from CEMS 116". The reconnection control apparatus 104 outputs the power reference signal (Pref) and the voltage reference signal (Vref) to the DER system 101.

The reconnection control apparatus 104 comprises a reconnection control unit 103, a first detecting unit 105 and a second detecting unit 106. The first detecting unit 105 inputs the AC voltage on the DER System-side of the switch 109 at point 113 and outputs the phase, frequency and amplitude information for the AC output voltage of the DER system 101. The second detecting unit 106 inputs the AC voltage on the power grid-side of the switch 109 at point 114 and outputs the phase, frequency and amplitude information for the AC voltage of the power grid 107. The reconnection control unit 103 receives the receiving information from the receiving unit 102, and the phase, frequency and amplitude information from the first detecting unit 105 and the phase, frequency and amplitude information from the second detecting unit 106. The reconnection 103 outputs the voltage reference signal (Vref) and the power reference signal (Pref) to the DER system 101.

The phase information detected by the first detecting unit 105 will be referred to as "phase of DER system", the frequency information detected by the first detecting unit 105 will be referred to as "frequency of DER system" and the amplitude information detected by the first detecting unit 105 will be referred to as "voltage amplitude of DER system".

The phase information detected by the second detecting unit 106 will be referred to as "phase of power grid", the frequency information detected by the second detecting unit 106 will be referred to as "frequency of power grid" and the amplitude information detected by the second detecting unit 106 will be referred to as "voltage amplitude of power grid".

Figure 6:
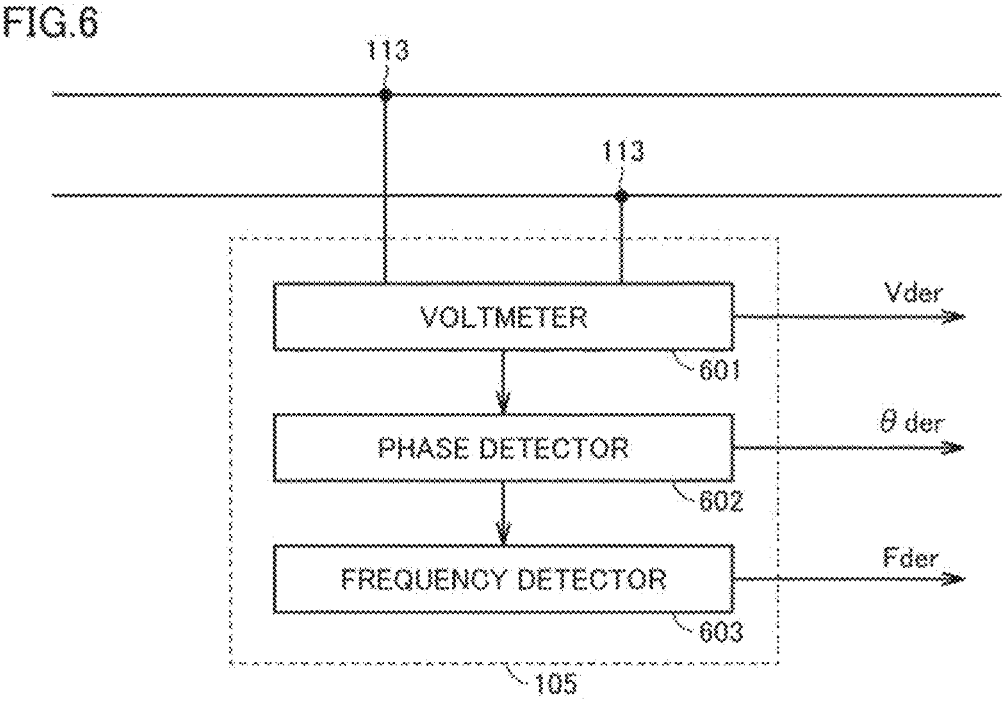
FIG. 6 is a block Diagram that describing structure of the detecting unit 1 shown in FIG. 1.

The general configuration of the first detecting unit 105 is given by FIG. 6. The first detecting unit 105 comprises a voltmeter 601, a phase detector 602, and a frequency detector 603.

The voltmeter 601 measures the AC output voltage on the DER system-side of the switch 109 at point 113. The voltmeter 601 outputs the voltage amplitude of the DER system (Vder). The phase detector 602 detects the phase of the AC voltage detected by voltmeter 601. The phase detector 602 outputs the phase of the DER system (Θder). The phase detector 602 also detects the zero-cross point of the AC voltage as measured by the voltmeter 601 and outputs it to the frequency detector 603.

The frequency detector 603 receives the zero-cross point information from the phase detector 602 and calculates the frequency by calculating the time between two zero cross points. The output of the frequency detector 603 is the frequency of the DER system (Fder).

Figure 7:
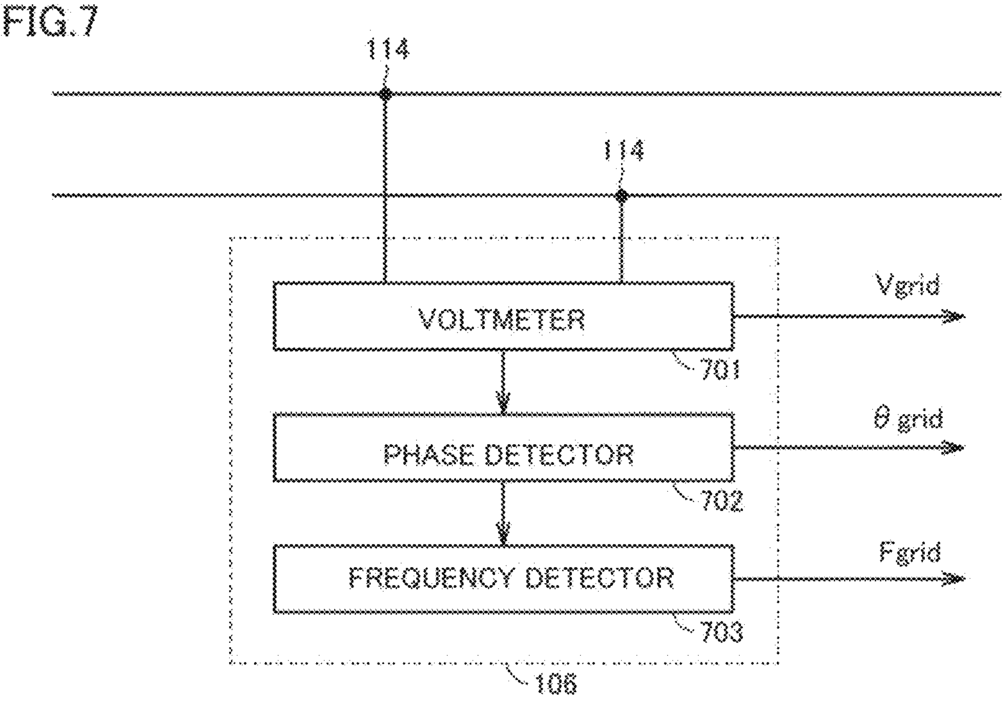
FIG. 7 is a block Diagram that describing the structure of the detecting unit 2 shown in FIG. 1.

The general configuration of the second detecting unit 106 is given by FIG. 7. The second detecting unit 106 comprises a voltmeter 701, a phase detector 702, and a frequency detector 703.

The general structure of the second detecting unit 106 is similar to that of the first detecting unit 105.

The voltmeter 701 that measures the AC output voltage of the on the power grid-side of the switch 109 at point 114. The voltmeter 701 outputs the voltage amplitude of the power grid (Vgrid). The phase detector 702 detects the phase of the AC voltage detected by voltmeter 701. The phase detector 702 outputs the phase of the DER system (θgrid). The phase detector 702 also detects the zero-cross point of the AC voltage as measured by the voltmeter 701 and outputs it to the frequency detector 703.

The frequency detector 703 receives the zero-cross point information from the phase detector 702 and calculates the frequency by calculating the time between two zero cross points. The output of the frequency detector 603 is the frequency of the power grid (Fgrid).

Figure 8:
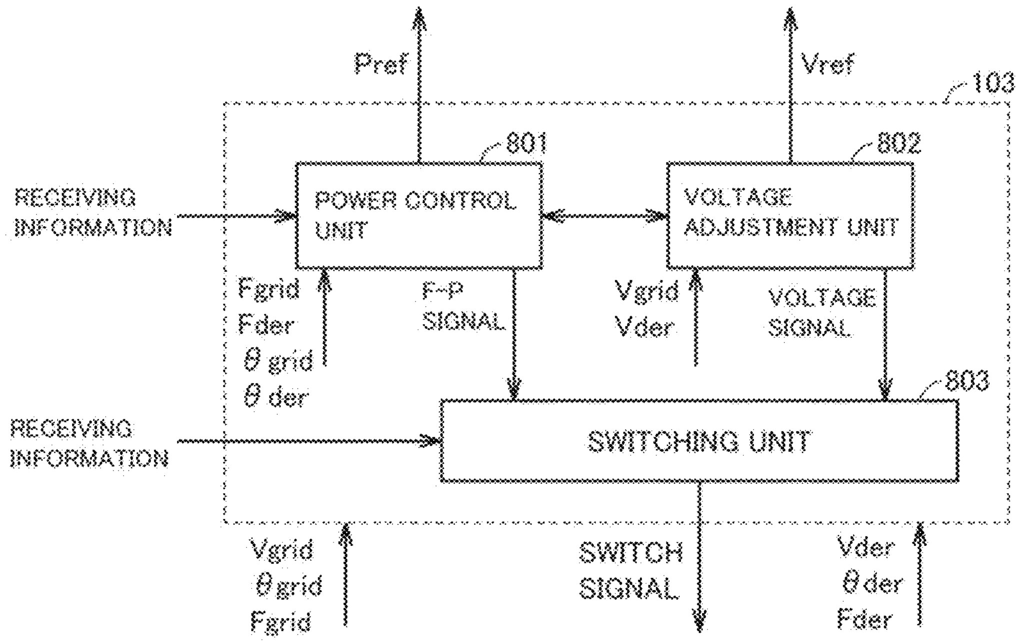
FIG. 8 is a block diagram describing the structure of the reconnection unit as shown in FIG. 1.

The general configuration of a reconnection unit 103 is given by FIG. 8. The reconnection control unit 103 comprises a power control unit 801, a voltage adjustment unit 802 and a switching unit 803. The power control unit 801 inputs the phase and the frequency of the DER system 101 (Fder,θder) as detected by the first detecting unit 105 as well as the phase and the frequency of the power grid 107 (Fgrid,θgrid) as detected by the second detecting unit 106. The power control unit 801 also inputs the receiving information about permissible thresholds from the receiving unit 102. Based on the inputs, the power control unit 801 calculates a power reference signal (Pref) to be sent to the DER system 101. The power control unit 801 also calculates the F-P signal to be sent to the switching unit 803.

The voltage adjustment unit 802 receives the voltage amplitude of the DER system 101 (Vder) as detected by the first detecting unit 105 and the voltage amplitude of the power grid 107 (Vgrid) as detected by the second detecting unit 106, and calculates a voltage reference signal (Vref) to be sent to the DER system 101. The voltage adjustment unit 802 also receives the receiving information about permissible thresholds and an original voltage reference (Vref_orig) from the receiving unit 102. The voltage adjustment unit 802 also calculates the voltage signal to be sent to the switching unit 803.

The switching unit 803 receives the F-P signal from the power control unit 801 and the voltage signal from the voltage adjustment unit 802. After receiving both signals, the switching unit 803 sends a switch signal to close the switch 109.

Figure 9:
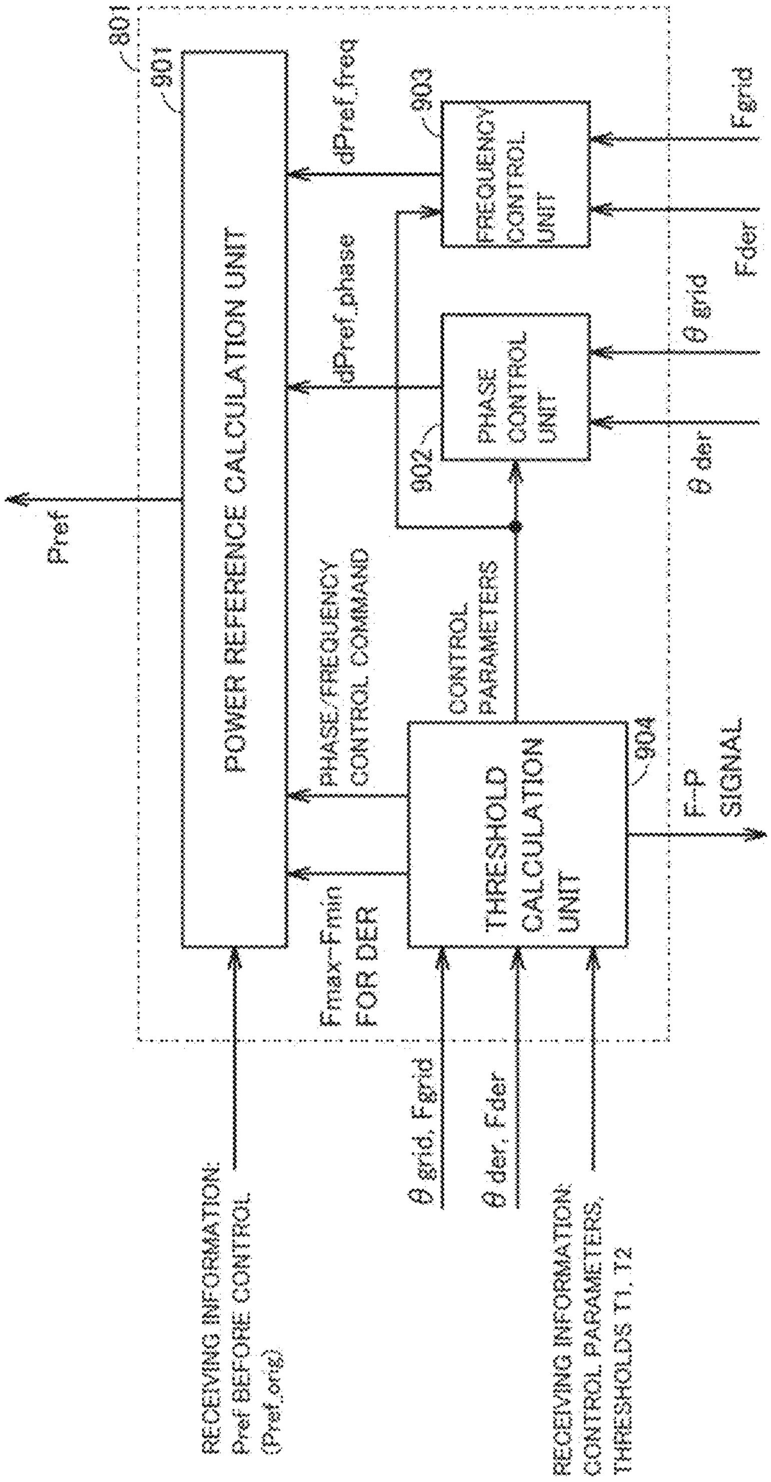
FIG. 9 is a block diagram describing the structure of the power control unit that as shown in FIG. 8.

The general configuration of the power control unit 801 is given by FIG. 9. The power control unit 801 comprises a threshold calculation unit 904, a phase control unit 902, a frequency control unit 903, and a power reference calculation unit 901.

The threshold calculation unit 904 receives the phase and the frequency of the DER system 101 (Fder,θder) from the first detecting unit 105 and the phase and frequency (Fgrid, θgrid) of the power grid 107 from the second detecting unit 106. The threshold calculation unit 904 also receives the receiving information from the receiving unit 102. The threshold calculation unit 904 calculates a safe range of frequency (Fmax−Fmin) and outputs it to the power reference calculation unit 901. Fmax means a maximum controllable frequency and Fmin means a minimum controllable frequency. The threshold calculation unit 904 also calculates the control parameters based on the receiving information from the receiving unit 102 and sends it to the phase control unit 902 and the frequency control unit 903. Based on the difference between the phase of the DER system 101 (θder) and the phase of the power grid 107 (θgrid), the threshold calculation unit 904 calculates the phase/frequency control command signal to be sent to the power reference calculation unit 901. Based on the difference between the phase and frequency of the DER system 101 (θder,Fder) and the phase and frequency of the power grid 107 (θgrid,Fgrid), the threshold calculation unit 904 calculates the F-P signal to be sent to switching unit 803.

The phase control unit 902 receives the control parameters from the threshold unit 904 and the phase of the DER system 101 (θder) from the first detecting unit 105 and the phase of the power grid 107 (θgrid) from the second detecting unit 106. Based on the received information, the phase control unit 902 calculates the phase power reference (dPref_phase) and sends it to the power reference calculation unit 901.

The frequency control unit 903 receives the control parameters from the threshold unit 904 and the frequency of the DER system 101 (Fder) from the first detecting unit 105 and the frequency of the power grid 107 (Fgrid) from the second detecting unit 106. Based on the received information, the frequency control unit 903 calculates the frequency power reference (dPref_frequency) and sends it to the power reference calculation unit 901.

The power reference calculation unit 901 receives the original power reference (Pref_orig) from the receiving unit 102, the safe range of frequency (Fmax−Fmin) and the phase/frequency control command from the threshold calculation unit 904, the phase power reference (dPref_phase) from the phase control unit 902 and the frequency power reference (dPref_freq) from the frequency control unit 903. Based on the inputs the power reference calculation unit 901 calculates the power reference signal (Pref) to be sent to the DER system 101.

Figure 10:
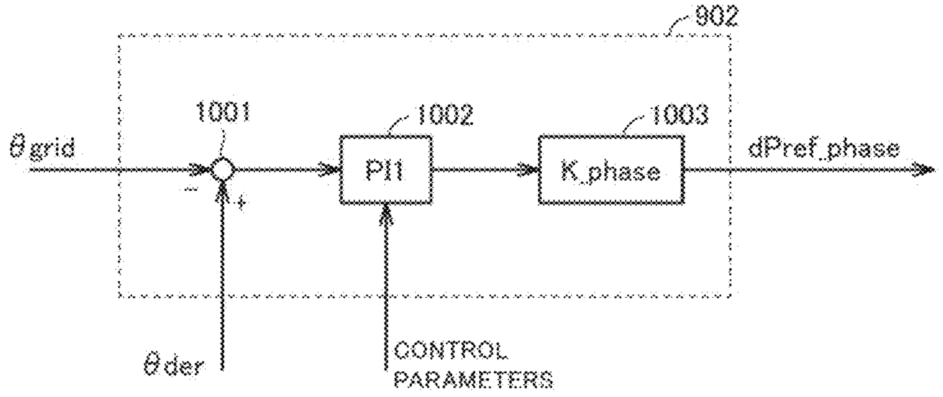
FIG. 10 is a block diagram describing the structure of the frequency control unit that as shown in FIG. 9.

The general configuration of the phase control unit 902 is given by FIG. 10. The phase control unit 902 comprises a subtractor 1001, a first PI block 1002, and a proportional gain circuit 1003.

The inputs to the phase control unit 902 are the phase of the DER system 101 and the phase of the power grid 107 (θder,θgrid). The subtractor 1001 calculates the difference between the phase of the power grid 107 and the phase of the DER system 101 (θder−θgrid). The result of the subtractor 1001 is given to the first PI block 1002 which is a PI controller unit. The first PI block 1002 implements a PI control based on the control parameters received from the threshold calculation unit 904 and generates a result which is given to the proportional gain circuit 1003. The proportional gain circuit 1003 multiplies the output of the first PI block 1002 with a gain (K_phase). The output of the proportional gain circuit 1003 is given to the power reference calculation unit 901 as the phase power reference (dPref_phase).

Figure 11:
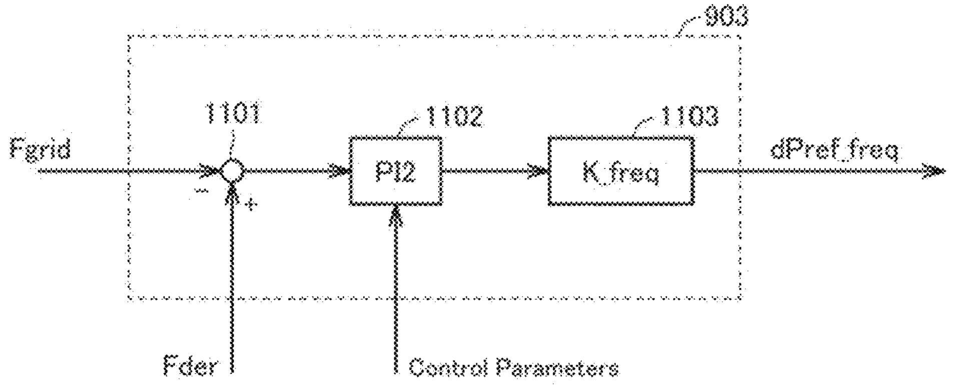
FIG. 11 is a block diagram describing the structure of the phase control unit that as shown in FIG. 9.

The general configuration of the frequency control unit 903 is given by FIG. 11. The frequency control unit 903 comprises a subtractor 1101, a second PI block 1102, a proportional gain circuit 1103.

The inputs to the frequency control unit 903 are the frequency of the DER system 101 and the frequency of the power grid 107 (Fder,Fgrid). The subtractor 1101 calculates the difference between the frequency of the power grid 107 and the frequency of the DER system 101 (Fder-Fgrid). The result of the subtractor 1101 is given to the second PI block 1102 which is a PI controller unit. The second PI block 1102 implements a PI control based on the control parameters received from the threshold calculation unit 904 and generates a result which is given to the proportional gain circuit 1103. The proportional gain circuit 1103 multiplies the output of the second PI block 1102 with a gain K_freq. The output of the proportional gain circuit 1103 is given to the power reference calculation unit 901 as the frequency power reference (dPref_freq).

Figure 12:
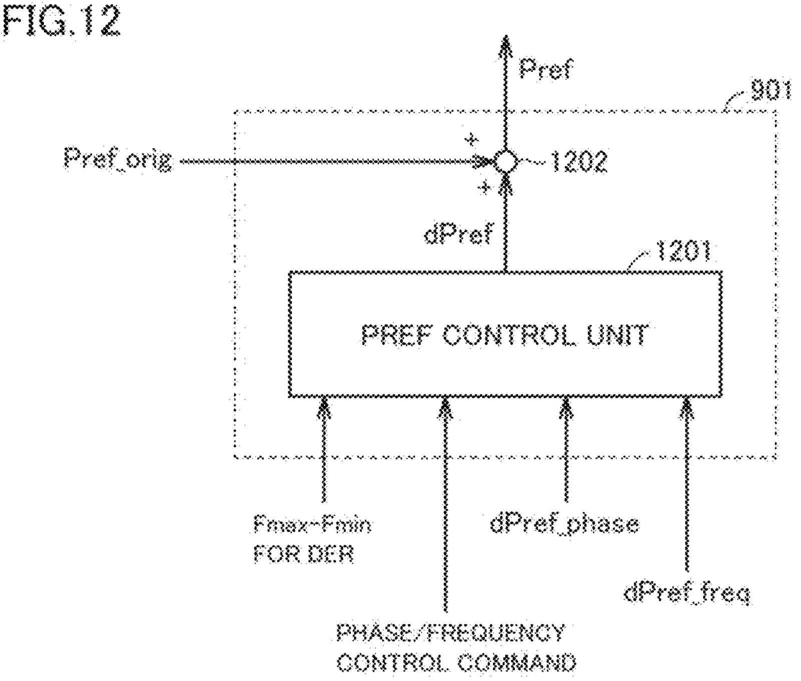
FIG. 12 is a block diagram describing the structure of the power reference calculation unit that as shown in FIG. 9.

The general configuration of the power reference calculation unit 901 is given by FIG. 12. The power reference calculation unit 901 comprises a Pref control unit 1201 and an addition circuit 1202. The Pref control unit 1201 receives the phase power reference (dPref_phase) from the phase control unit 902 and the frequency power reference (dPref_freq) from the frequency control unit 903. The Pref control unit 1201 also receives the phase/frequency control command and the safe range of frequency (Fmax–Fmin) from the threshold calculation unit 904.

The Pref control unit 1201 calculates and outputs the power reference correction value (dPref) based on the phase power reference (dPref_phase) and the frequency power reference (dPref_freq) according to the phase/frequency control command. The Pref control unit 1201 also limits the power reference correction value (dPref) so that the frequency of the DER system 101 is kept within the safe range of frequency (Fmax–Fmin) as given by the threshold calculation unit 904. The addition circuit 1202 adds the power reference correction value (dPref) to the original power reference (Pref_orig) to calculate the power reference signal (Pref) which is sent to the DER system 101.

Figure 13:
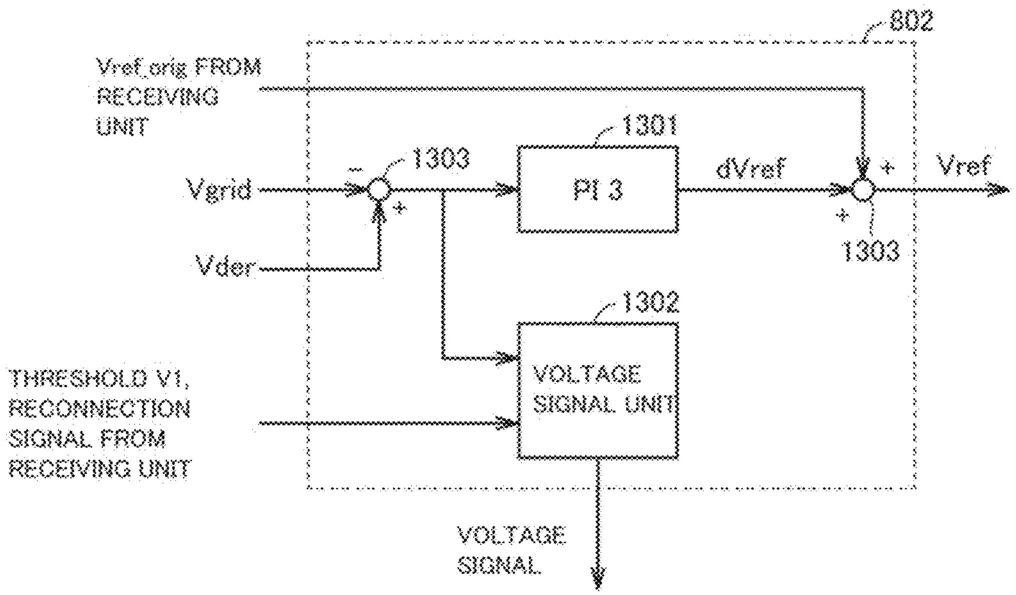
FIG. 13 is a block diagram describing the structure of the voltage adjustment unit as shown in FIG. 8.

The voltage adjustment unit 802 is given by FIG. 13. The voltage adjustment unit 802 comprises a subtractor 1303, a third PI block 1301, an addition circuit 1303, a voltage signal unit 1302.

First, the subtractor 1303 calculates the difference between the amplitude of the voltage of the DER system 101 (Vder) and the amplitude of the voltage of the power grid 107 (Vgrid) as detected by the first detecting unit 105 and the second detecting unit 106 respectively. This difference is given to the third PI block 1301 which is a PI controller and calculates the voltage command value (dVref). The voltage command value (dVref) is added to the original voltage reference (Vref_orig) as received from the receiving unit 102 by the addition circuit 1304. The output of the addition circuit 1303 is the voltage reference signal (Vref) which is sent to the DER system 101. The voltage signal unit 1302 receives the difference between the amplitude of the voltage of the DER system 101 (Vder) and the amplitude of the voltage of the power grid 107 (Vgrid) from the subtractor 1303 and the third threshold V1 for voltage from the receiving unit 102. When the difference is less than the third threshold value, the voltage signal unit 1302 sends the voltage signal to the switching unit 803.

The switching unit 803 receives the F-P signal from the power control unit 801 indicating that the difference between the phase and frequency of the voltage of the DER system 101 (θder,Vder) and the phase and frequency of the voltage of the power grid 107 (θgrid,Vgrid) is within the predetermined threshold, and the voltage signal from the voltage adjustment unit 802 indicating that the difference between the amplitude of the voltage of the DER system 101 (Vder) as detected by the first detecting unit 105 and the amplitude of the voltage of the power grid 107 (Vgrid) as detected by the second detecting unit 106 is within a predetermined threshold range. The switching unit 803 also receives the receiving information from the CEMS 116 via the receiving unit 102. This information may consist of the reconnection signal, when it is desirable for the DER system 101 to be reconnected to the power grid 107.

When the F-P signal and the voltage signal are both received, the switching unit 803 close the switch 109.

Operation

Virtual Synchronous Generator Technology Overview:

For the first embodiment, the DER system 101 is a virtual synchronous generator. Hereinafter, the virtual synchronous generator technology will be explained briefly.

Synchronous generators are typically used for thermal power generation and have the following characteristics: to adjust an output power according to the frequency (governor control), to maintain the angular velocity (inertial behavior), to synchronize with the system voltage (voltage synchronization), to adjust the voltage of the power grid (AVR control: Automatic Voltage Regulation control) and to continue the operation even when the AC system voltage drops momentarily in the event of a fault or an accident.

In the virtual synchronous generator control technology, by controlling the transient response of the power electronic inverter, the inverter is made to simulate the function of the synchronous generator. Specifically, the governor controls the inertial force by simulating a calculation system to imitate the dynamic characteristics of a synchronous generator based on a swing equation and the AVR control.

In the first embodiment, the DER system 101 comprises the inverter control unit 304 which comprises the VSG control unit 404. The VSG control unit 404 will carry out the operation of the governor control as well as the operation of imitating the inertial behavior according to the swing equation. Hereafter, the governor control operation and the operation to imitate inertial behavior according to the swing equation will be specifically described.

First, the operation of the governor will be briefly described. The governor in a power plant has a function of controlling the output power of a generator by controlling the output of a gas turbine or a steam turbine in a thermal power generation and a nuclear power generation, or the guide vane of a water turbine in a hydroelectric power generation. When the demand power exceeds the supply power in the AC power system, the frequency of the voltage of the AC power system voltage falls. In a thermal power generator or a hydroelectric generator capable of output control, the governor is provided with a droop characteristic, so that the generator increases the generated power when the frequency of the system voltage decreases. On the other hand, when the frequency of the system voltage rises due to the supply power exceeding the demand power, the generator reduces the generated power.

In the first embodiment, the operation of the governor is estimated by equation (1) which is a model with a first order lag.

[Math. 1]

$$G(s) = \frac{-1}{K_g(1 + T_g s)} \tag{1}$$

Here, the proportional gain is (−1/Kg) where Kg and Tg is the time constant of the first order lag.

For the inertial behavior, the synchronous generator has a rotor having an inertial constant of M. For example, when the generated power of the DER with DC source 301 suddenly decreases due to a sudden change in the amount of a solar radiation, the governor control cannot instantly cover the insufficient power. The synchronous generator converts the rotational energy stored in the rotor into the electric power and outputs it to the AC system. At that time, when the angular velocity (rotational speed) of the rotor decreases, the energy supplied by the governor control increases, so that the required power and the supplied power are balanced. Equation (2) shows the swing equation which gives the relation between the output frequency of the synchronous generator in relation to the input and output power.

[Math. 2]

$$P_{in} - P_{out} = M\frac{d\omega}{dt} + D_g\omega \tag{2}$$

Here, Pin is the input power to the synchronous generator, Pout is the output power of the synchronous generator, M is the inertial constant, W is the angular velocity and Dg is the damping co-efficient.

In the first embodiment the governor control is implemented by using equation (1) in the governor control unit 502 and the inertial behavior with the swing equation given by equation (2) is implemented in the main VSG control unit 505 in the VSG control unit 404 of the inverter control unit 304 of the DER system 101.

Figure 14:
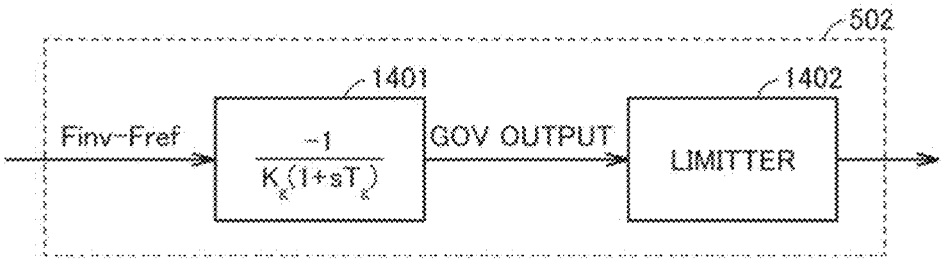
FIG. 14 is a block diagram describing the working of the governor unit 502 given in FIG. 5.

The working of the governor unit 502 is given in FIG. 14. The block 1401 is a governor equation block which implements the governor equation given by equation (1) by inputting the output of subtractor 501 (Finv-Fref). The output of the governor equation is given to a limiter circuit 1402 which limits the governor output to a certain range to avoid over a certain range.

Figure 15:
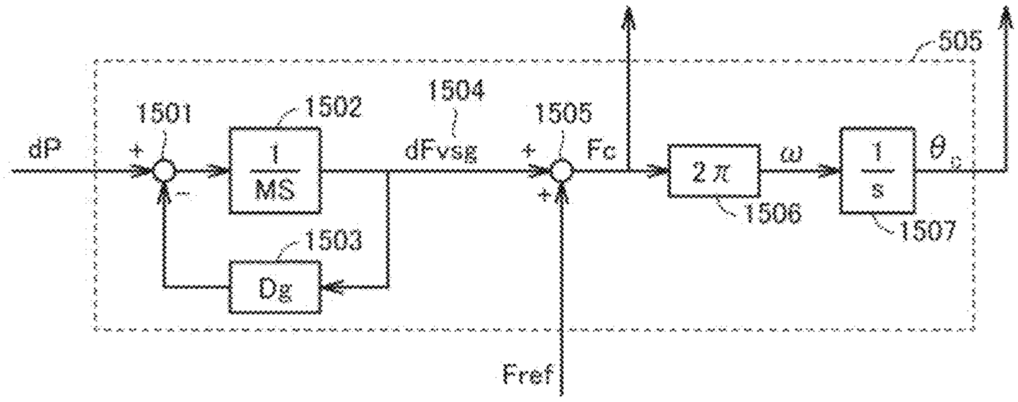
FIG. 15 is a block diagram describing the working of the main VSG control unit given in FIG. 5.

The working of the main VSG control unit 505 is explained by FIG. 15. The main VSG control unit 505 comprises an addition circuit 1501, an integrator block 1502, a proportional gain block 1503, an addition circuit 1505, a proportional gain block 1506, and an integrator circuit 1507.

The output of the subtractor 504 (dP) is given to the addition circuit 1501. The addition circuit 1501 adds the output of the subtractor 504 (dP) and the output of the proportional gain block 1503. The output of the addition circuit 1501 is given to the integrator block 1502. The integrator block 1502 is an integrator and has a gain of (1/M). The output of the integrator 1502 (dFvsg) is fed to the proportional gain block 1503 which has a gain of Dg.

It can be seen that a variation of the swing equation given by equation (2) is implemented to obtain the dFvsg 1504 in relation to dP. The output of the integrator 1502 is given to the addition circuit 1505, which adds dFvsg 1504 to the frequency reference signal (Fref) as obtained from the CEMS 116 through the receiving unit 102. The output of the addition circuit 1505 is the frequency command value (Fc). The frequency command value (Fc) is given to the voltage command calculation unit 402. The output of the addition circuit 1505 is also given to the proportional gain block 1506 which converts the output of the addition circuit 1505 (Fc) to radians by multiplying by 2π. The output of the proportional gain 1506 is given to the integrator circuit 1507 to calculate the phase command value (θc) which is given to the voltage command calculation unit 402.

Thus, the governor control unit 502 implements the governor control and the main VSG control unit 505 implements the inertial behavior through the swing equation to simulate the synchronous generator characteristics of the inverter 302 through an inverter control unit 304.

Next, the steady state relation between dF (Fref-Finv) and dP (Pref-Pout) will be described with FIG. 16. These characteristics are called as "droop" characteristics and give the relationship between dP and dF. The horizontal axis gives dF which is the deviation of the inverter frequency (Finv) from frequency reference signal (Fref) as obtained from the CEMS 116 through the receiving unit 102, and the vertical axis gives dP which is a deviation of the output power (Pout) of the inverter 302 as calculated by the power calculation unit 403 from the power reference signal (Pref) as calculated by the reconnection control apparatus 104. Thus, the deviation (dF) of the inverter frequency (Finv) from the frequency reference signal (Fref) is linearly proportional to the deviation (dP) of the output power (Pout) from the power reference signal (Pref). The slope of this linear graph is dependent on the nominal capacity of the DER system 101, the governor gain Kg as well as the damping co-efficient Dg of the VSG control. The steady state relationship between dP and dF is given by Equation (3).

[Math. 3]

$$dP = \frac{P_{base}}{D_g + K_g}dF \tag{3}$$

Figure 16:
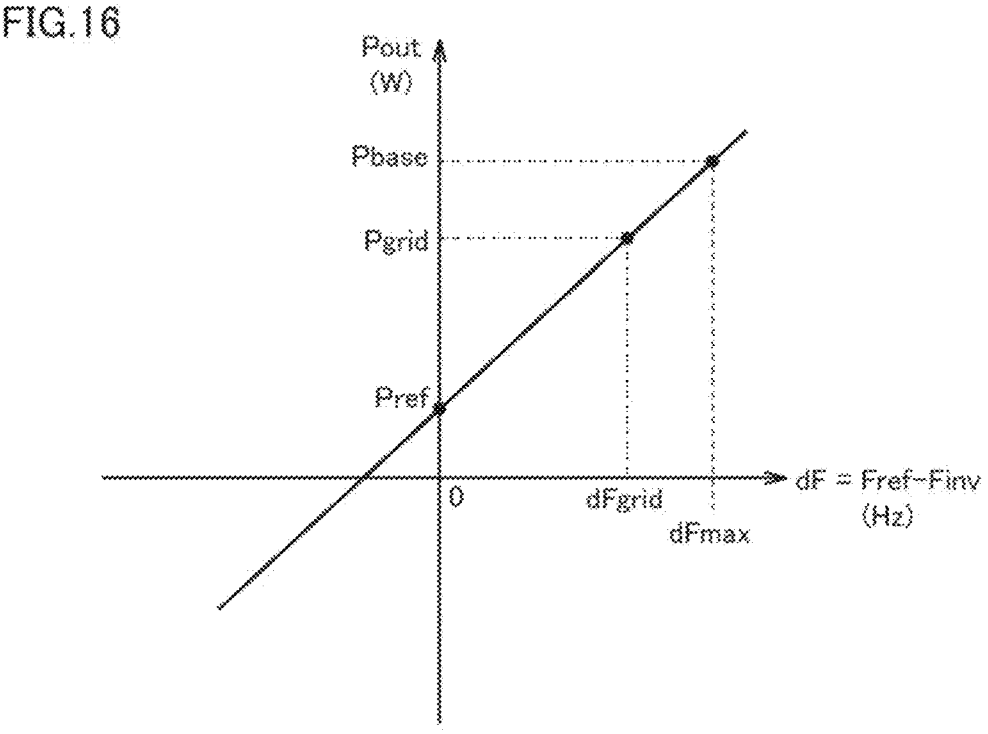
FIG. 16 is a graph showing the droop characteristics of the DER system 101 in terms of the power output of the DER system 101 (in watts) and the deviation of the frequency of the DER system 101 from the reference frequency (dF=Fref−Fder).

By changing the power reference signal (Pref) of the DER system 101, dP will change, thus, with (dF-dP) characteristics as given by FIG. 16, it is possible to change inverter frequency (Finv). This principle will be implemented for the operation of the reconnection control apparatus 104 to achieve the phase and frequency matching control.

When the DER system 101 with droop characteristics as explained in FIG. 16, and implementing VSG control through the inverter control unit 304 is to be reconnected to the power grid 107 through the switch 109, it is desirable that the phase, the frequency and the amplitude of the voltage on the DER system-side of the switch 109 at point 113 matches the phase, the frequency and the amplitude of the voltage of the power grid-side of the switch 109 at point 114.

FIG. 16 shows the droop characteristics of the DER system 101 with respect to the output of the DER system 101 (in watts) and the deviation of the frequency of the DER system 101 from the reference frequency (dF=Fref−Fder). According to the steady state equation, when Fder=Fref, the output power of the DER system 101 is given by Pref. Pbase indicates the nominal capacity of the DER system 101. It should be noted that Fmax is a maximum deviation from the reference frequency such that the output power of the DER system 101 does not go beyond the nominal capacity, and Fmax is the corresponding frequency, hereafter referred to as "maximum controllable frequency". Please note that dFgrid is the deviation of the frequency of the power grid 107 from the reference frequency (Fref). In the example given by FIG. 16, the frequency of the power grid (Fgrid) is lower than the maximum controllable frequency (Fmax) of the DER system 101. If, during reconnection, the frequency of the DER system 101 goes beyond the maximum controllable frequency (Fmax), then the frequency of the DER system 101 cannot be controlled, making the reconnection unstable.

As a simulation result example, FIGS. 17A, 17B, 18A, and 18B show the simulation results when the DER system 101 is connected to the power grid 107 for different phase conditions. For the simulation results in FIGS. 17A, 17B, 18A, and 18B, the simulation conditions are as follows: the frequency of the power grid 107 is 60.1 Hz, the frequency of the DER system 101 before reconnection is the reference frequency 60 Hz (Fder–Fref). The maximum controllable frequency (Fmax) corresponding to the nominal capacity of the DER system 101 is 60.15 Hz. The frequency of the power grid (Fgrid) is lower than the maximum controllable frequency (Fmax). Thus, the frequency of the power grid (Fgrid) is within the acceptable limits for reconnection.

Figure 17A:
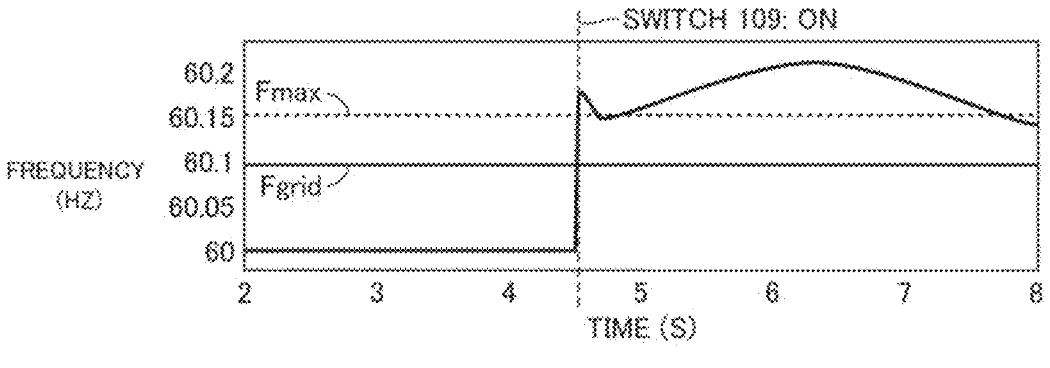
FIG. 17A is simulation graphs describing the frequency of the DER system 101 and the power grid 107 when the switch 109 is closed when there is considerable difference between the phase and frequency of the DER system 101 with respect to the first embodiment.
Figure 17B:
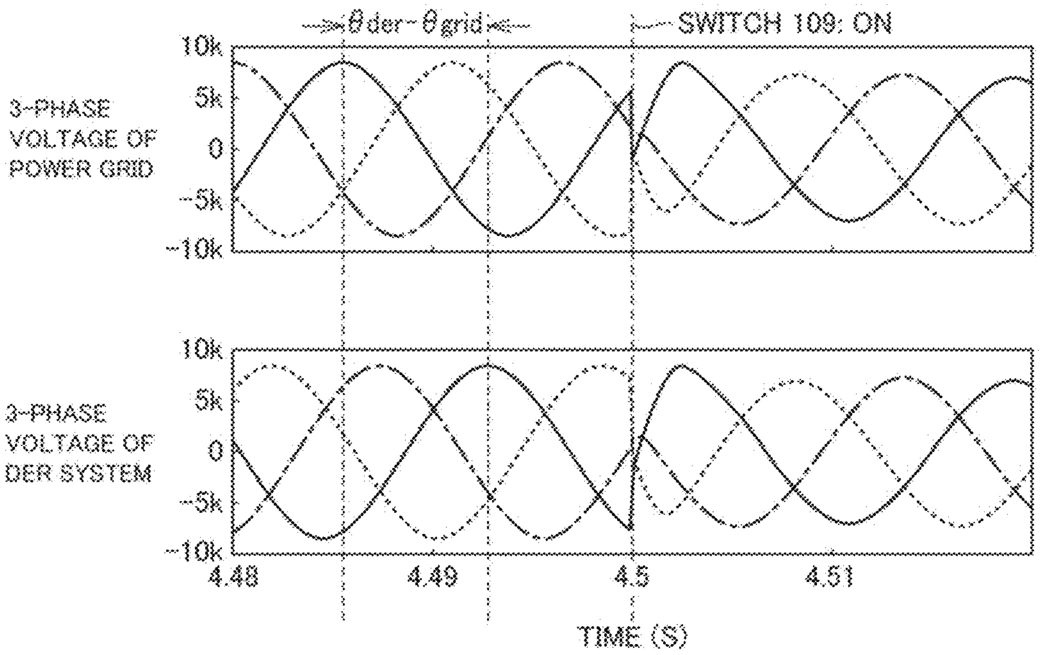
FIG. 17B is a simulation graph describing the voltage of the DER system 101 and the power grid 107 when the switch 109 is closed when there is considerable difference between the phase and frequency of the DER system 101 and phase and frequency of the power grid 107 with respect to the first embodiment.

FIGS. 17A and 17B show the simulation results when the difference in the phase of the DER system 101 and the phase of the power grid 107 (θder–θgrid) is beyond acceptable limits. The switch 109 is switched on at 4.5 s. The phase difference at this time is around 160 degrees.

FIG. 17A is a graph of the frequency of the DER system 101 at point 113, the frequency of the power grid 107 at point 114 with respect to time when the switch 109 is closed as well as the maximum controllable frequency (Fmax) of the DER system 101. From FIG. 17A, after the point of reconnection at 4.5 s, the frequency of the DER system 101 becomes higher than the maximum controllable frequency (Fmax). This is caused due to the transient occurring due to the large phase difference between the phase of the DER system 101 and the power grid 107. Thus, even though the frequency of the power grid 107 (Fgrid) at the time of reconnection is within the acceptable frequency range (Fgrid<Fmax), the transient caused by the phase difference, causes the frequency of the DER system 101 (Fder) to go out of controllable range. The phase difference at the time of reconnection causes a large disturbance in the frequency when the switch 109 is closed, thus causing the frequency to go significantly out of step to the grid frequency, making the reconnection unstable.

FIG. 17B is a graph showing the waveform of the three-phase voltage at point 113 (Vder) (bottom graph) and the three-phase voltage at point 114 (Vgrid) (top graph) when the switch 109 is closed. FIG. 17A shows that after reconnection the voltage of the DER system 101 as well as the power grid 107 becomes a distorted sinusoidal as the phase of the DER system 101 at point 113 is not matched with the phase of the power grid 107 at point 114 during reconnection. As the frequency of the DER system (Fder) goes beyond the controllable range, as time goes on the voltage output of the DER system diverges. Thus, the conditions shown in FIGS. 17A and 17B are undesirable.

FIGS. 18 A and 18B show the simulation results when the difference in the phase of the DER system 101 and the phase of the power grid 107 (θder–θgrid) is within acceptable limits. The switch 109 is switched on at 1.63 s. The phase difference at this time is around 5 degrees.

Figure 18A:
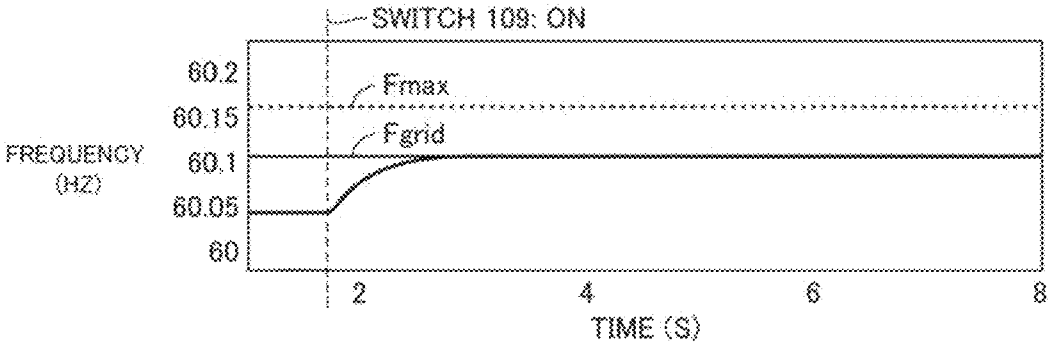
FIG. 18A is a simulation graph describing the frequency of the DER system 101 and the power grid 107 when the switch 109 is closed when there is almost no difference between the phase and frequency of the DER system 101 with respect to the first embodiment.

FIG. 18A is a graph of the frequency of the DER system 101 at point 113, the frequency of the power grid 107 at point 114 with respect to time when the switch 109 is closed as well as the maximum controllable frequency (Fmax) of the DER system 101.

From FIG. 18A it can be seen that, during reconnection, there is no transient overshoot, and the frequency of the DER system 101 does not exceed the maximum controllable frequency (Fmax), and smoothly converges to the frequency of the power grid 107 (Fgrid).

Figure 18B:
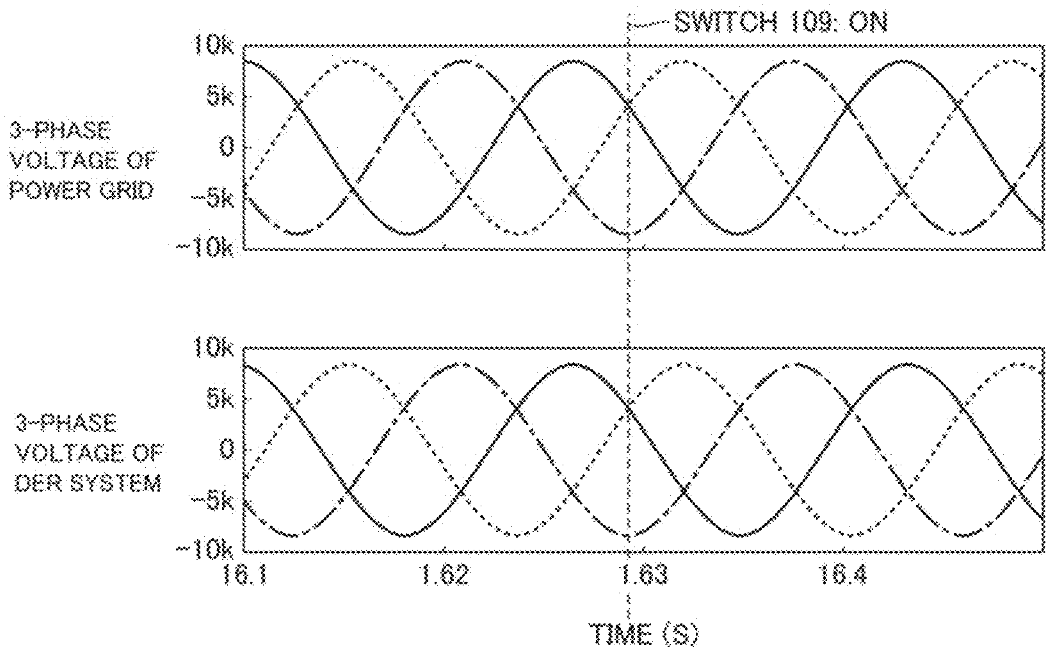
FIG. 18B is a simulation graph describing the voltage of the DER system 101 and the power grid 107 when the switch 109 is closed when there is almost no difference between the phase and frequency of the DER system 101 and phase and frequency of the power grid 107 with respect to the first embodiment.

FIG. 18B is a graph showing the waveform of the three-phase voltage at point 113 (Vder) (bottom graph) and the three-phase voltage at point 114 (Vgrid) (top graph), when the switch 109 is closed. FIG. 18A shows that after reconnection the voltage of the DER system 101 as well as the power grid 107 is maintained at the nominal value before reconnection, and reconnection takes place smoothly.

When operating independently, the phase, the frequency and the amplitude of the voltage of the DER system 101 do not necessarily match the phase, the frequency and the amplitude of the voltage of the power grid 107, and if the DER system 101 is reconnected to the power grid 107 at these unmatched conditions, the voltage of the DER system 101 may diverge, causing harmful conditions. To avoid this, the reconnection control apparatus 104 performs the phase, frequency and amplitude matching control.

Next, the working of the reconnection control apparatus 104 with respect to the first embodiment will be explained in detail. The reconnection control apparatus 104 is a device that helps to match the phase, the frequency and the amplitude of the voltage on either side of the switch 109. The reconnection control apparatus 104 starts the operation when it receives the "reconnection signal" from the CEMS 116, indicating that it is desirable to reconnect the DER system 101 to the power grid 107 through the switch 109.

With reference to FIG. 1, the reconnection control apparatus 104 detects the phase, the frequency and the amplitude of the voltage on the DER system-side of the switch 109 as well as the phase, the frequency and the amplitude of the voltage on the power gird-side of the switch 109, and then sends a power reference signal (Pref) and a voltage reference signal (Vref) to the DER system 101, such that the phase, the frequency and the amplitude of the voltage of the DER system 101 matches the phase, the frequency and the amplitude of the voltage of the power grid 107.

The reconnection control apparatus 104 comprises two detecting units 105, 106 to detect the phase, the frequency and the amplitude of the voltage on either side of the switch 109 and a reconnection control unit 103 which performs the operation of the phase and frequency matching control. The working of the reconnection control apparatus 104 mainly concerns the operation of the reconnection unit 103.

The details of the reconnection unit 103 are provided in FIG. 8. From FIG. 8, it can be seen that the reconnection control unit 103 performs the operation of the phase and frequency matching control through the power control unit 801 and the amplitude matching control through the voltage adjustment unit 802. The switching unit 803 is responsible for the switching of the switch 109 based on signals received from the power control unit 801 and the voltage adjustment unit 802. The operation of the reconnection unit 103 is explained briefly by explaining the operating conditions and the operating sequences of the power control unit 801, the voltage adjustment unit 802 and the switching unit 803.

Figure 19:
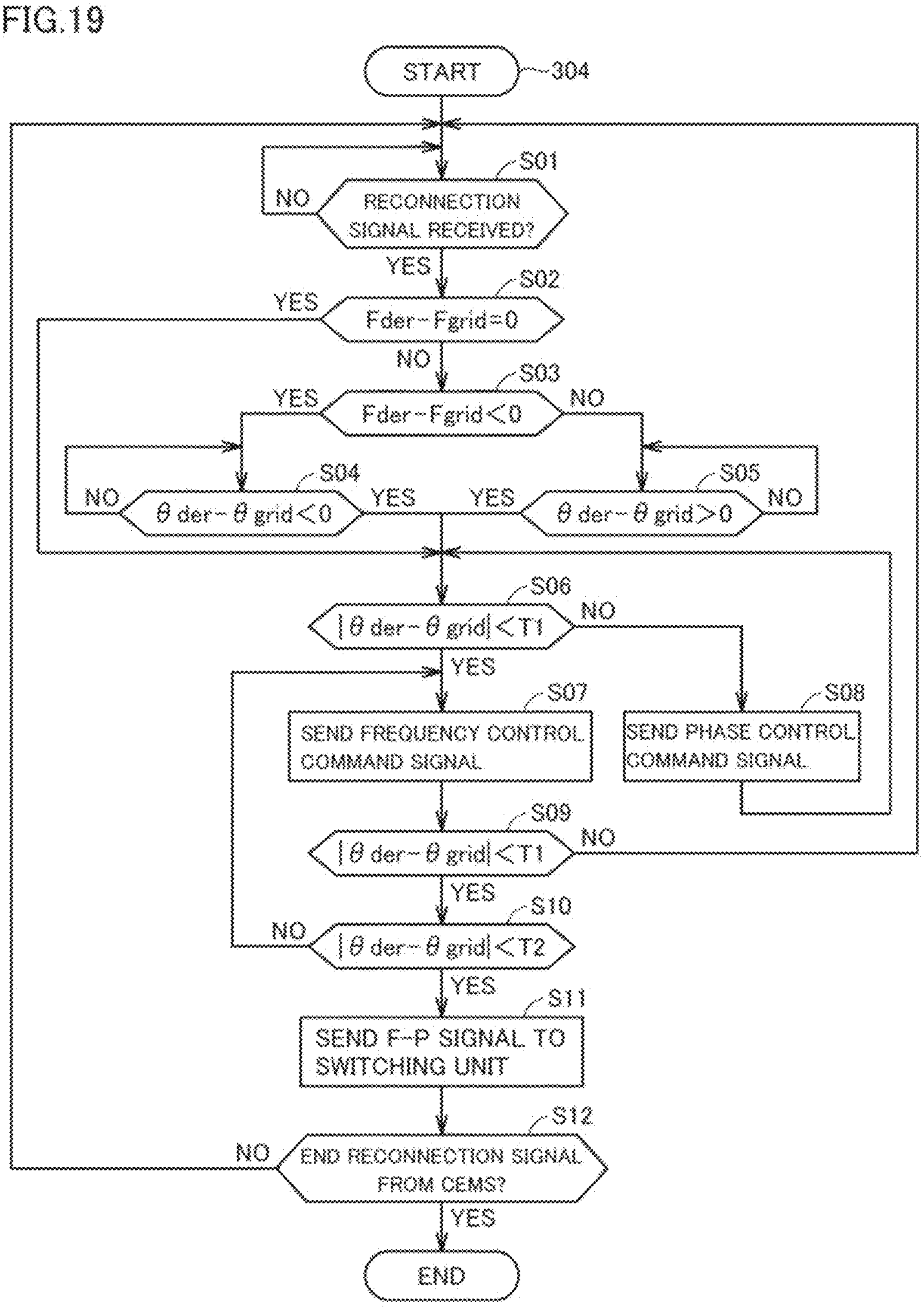
FIG. 19 is a flow chart describing the operation of the power control unit 801 shown in FIG. 8.

The operation of the power control unit 801 is explained by the flowchart given by FIG. 19, and will be explained based on the detailed construction of the power control unit 801 as given by FIG. 9. When it is desirable to reconnect the DER system 101 to the power grid 107, the CEMS 116 sends a reconnection signal to the threshold calculation unit 904 via the receiving unit 102. As shown in FIG. 19 in step (hereafter abbreviated as S01) the threshold calculation unit 904 checks if the reconnection signal is received from the CEMS 116 through the receiving unit 102, indicating that reconnection of the DER system 101 to the power grid 107 is desirable. If the reconnection signal is not received (NO in S01), the process will wait until it is received and return to the Start.

If the reconnection signal is received, (YES in S01), to perform the phase and frequency matching control, first the threshold calculation unit 904 needs to confirm the right relationship between the frequency difference (Fder−Fgrid) and the phase difference (θder−θgrid). If the voltage of the power grid 107 as measured by the second detecting unit 106 is in a leading phase as compared to the output voltage of the DER system 101 as measured by the first detecting unit 105, then it is considered that θgrid>θder. Conversely, the voltage of the DER system 101 as measured by the first detecting unit 105 is in a leading phase as compared to the output voltage of the power grid 107 as measured by the second detecting unit 106, then it is considered that θder>θgrid.

To perform the phase and frequency control it is necessary that if the frequency of the power grid 107 is greater than the frequency of the DER system 101 (Fgrid>Fder), then the phase of the power grid 107 should also be greater than the phase of the DER system 101 (θgrid>θder). Conversely, if the frequency of the DER system 101 is greater than the frequency of the power grid 107 (Fder>Fgrid), then the phase of the DER system 101 should also be greater than the phase of the power grid 107 (θder>θgrid). If the frequency of the power grid 107 is greater than the frequency of the DER system 101 (Fgrid>Fder), and the phase of the power grid 107 is not greater than the phase of the DER system 101 (θgrid<θder), then it is desirable to wait until the phase of the power gird 107 exceeds the phase of the DER system 101. Similarly, if the frequency of the DER system 101 is greater than the frequency of the power gird 107 (Fder>Fgrid), and the phase of the DER system 101 is not greater than the phase of the power gird 107 (θder<θgrid), then it is desirable to wait until the phase of the DER system 101 exceeds the phase of the power grid 107.

To check the relationship between the phase difference and the frequency difference, the following operation is performed in the threshold calculation unit 904. In S02, the threshold calculation unit 904 checks to see if the frequency of the DER system 101 (Fder) received through the first detecting unit 105 at point 113 is equal to the frequency of the power grid 107 (Fgrid) as detected by the second detecting unit 106 at point 114. If the frequency of the DER system 101 (Fder) is not equal to the frequency of the power grid 107 (Fgrid) (NO in S02), then the process moves to S03. If the frequency of the DER system 101 (Fder) is equal to the frequency of the power grid 107 (Fgrid) (YES in S02), then it is not necessary to confirm the phase difference, as the phase difference will not change as time passes, thus, the process moves directly to S06.

The reconnection control apparatus 104 carries out reconnection control in the conditions that Fder−Fgrid>0 and θder−θgrid>0 or Fder−Fgrid<0 and θder−θgrid<0. If these conditions are not satisfied, the threshold calculation unit 904 will wait so that the conditions are satisfied before proceeding to the control algorithm. In S03 the threshold calculation unit 904 checks the difference between the frequency of the DER system 101 and the frequency of the power grid 107 (Fder−Fgrid) to see if the (Fder−Fgrid) is less than zero. If (Fder−Fgrid) is less than zero (YES in S03), the threshold calculation unit 904 checks the difference between the phase of the DER system 101 and the phase of the power grid 107 (θder−θgrid) to see if (θder−θgrid) is less than zero in S04. If (θder−θgrid) is less than zero (YES in S04), the process moves to step S06. If (θder−θgrid) is greater than zero (NO in S04), then the system waits until this condition is satisfied.

On the other hand, if (Fder−Fgrid) is not less than zero (NO in S03), then the threshold calculation unit 904 checks the difference between the phase of the DER system 101 and the phase of the power grid 107 (θder−θgrid) to see if (θder−θgrid) is greater than zero in S05. If (θder−θgrid) is greater than zero (YES in S05), the process moves to step S06. If (θder−θgrid) is less than zero (NO in S05), then the system waits until this condition is satisfied.

In S06, the threshold calculation unit 904 checks to see that the absolute value of the difference between the phase of the DER system 101 and the phase of the power grid 107 to check if it is less than a first threshold T1 as received from the CEMS 116, through receiving unit 102. If the absolute value difference between the phase of the DER system 101 and the phase of the power grid 107 is not less than the first threshold T1 (NO in S06), then the threshold calculation unit 904 sends a phase control command as the "phase/frequency control command" to the power reference calculation unit 901.

The power reference calculation unit 901 receives the phase control command as the "phase/frequency control command" from the threshold calculation unit 904. The power reference calculation unit 901 calculates the power reference signal (Pref) to be sent to the DER system 101 based on the phase power reference (dPref_phase) as obtained from the phase control unit 902 to execute the phase control to match the phase of the DER system 101 (θder) to the phase of the power grid 107 (θgrid).

As shown in FIG. 12 (construction of the power reference calculation unit 901), the power reference correction value (dPref) is added to the original power reference (Pref_orig) as received from the CEMS 116 and, the power reference (Pref) is generated. The power reference (Pref) is sent to the DER system 101, to change the frequency of the DER system 101 (Fder). Thus, by generating a power reference signal (Pref) to corresponding to the difference between the phase of the DER system 101 and the phase of the power grid 107 (θder−θgrid), the phase matching control is performed.

The phase power reference (dPref phase) is generated in the phase control unit 902. The operation of the phase control unit 902 can be understood with the help of FIG. 10. The phase control unit 902 receives the input of the phase of the DER system 101 (θder) at point 113 from the first detecting unit 105 and the phase of the power grid 107 (θgrid) at point 114 from the second detecting unit 106. The subtractor 1001 calculates the difference between the phase of the DER system 101 (θder) and the phase of the power grid 107 (θgrid), the output of the subtractor 1001 is sent to the first PI block 1002. The first PI block 1002 is a PI controller that calculates the error signal such that the difference between the phase of the DER system 101 (θder) and the phase of the power grid 107 (θgrid) is reduced to zero. The first PI block 1002 receives the control parameters from the CEMS 116 through the threshold calculation unit 904. The error signal generated by the first PI block 1002 is scaled by a proportional constant (K_phase) in the proportional gain circuit 1003 to generate the phase power reference (dPref_phase).

After executing S08, the process returns to S06 and continues until the phase difference |θder−θgrid| is within the first threshold T1. If the phase difference |θder−θgrid| is within the first threshold T1 (YES in S06), the threshold calculation nit 904 sends a frequency control command as the "phase/frequency control command" to the power reference calculation unit 901(In S07).

Similar to the phase control, when the power reference calculation unit 901 receives the frequency control command as the "phase/frequency control command", the power reference calculation unit 901 assigns the frequency power reference (dPref_freq) to the power reference correction value (dPref) to execute the frequency control to match the frequency of the DER system 101 (Fder) to the frequency of the power grid 107 (Fgrid). As shown in FIG. 12 (construction of the power reference calculation unit 901), when the power reference correction value (dPref) is added to the original power reference (Pref_orig) as received from the CEMS 116, the power reference signal (Pref) signal is generated. The power reference signal (Pref) is sent to the DER system 101, to change the frequency of the DER system 101 (Fder). Thus, by generating a power reference signal (Pref) corresponding to the difference between the phase of the DER system 101 and the phase of the power grid 107 (θder−θgrid), the frequency matching control is performed.

The frequency power reference (dPref_freq) is generated in the frequency control unit 903. The operation of the frequency control unit 903 can be understood with the help of FIG. 11. The frequency control unit receives the input of the frequency of the DER system 101 (Fder) at point 113 from the first detecting unit 105 and the frequency of the power grid 107 (Fgrid) at point 114 from the second detecting unit 106. The subtractor 1101 calculates the difference between the frequency of the DER system 101 (Fder) and the frequency of the power grid 107 (Fgrid), the output of the subtractor 1101 is sent to the second PI block 1102. The second PI block 1102 is a PI controller that calculates the error signal such that the difference between the frequency of the DER system 101 (Fder) and the frequency of the power grid 107 (Fgrid) is reduced to zero. The second PI block 1102 receives the control parameters from the CEMS 116 through the threshold calculation unit 904. The error signal generated by the second PI block 1102 is scaled by a proportional constant (K_freq) in the proportional gain circuit 1103 to generate the frequency power reference (dPref_freq).

After executing S07, the threshold calculation unit 904 again makes sure that the |θder−θgrid| is within the first threshold T1 in S09. If |θder−θgrid| is within the first threshold T1 (YES in S09), the threshold calculation unit 904 checks if the phase difference |θder−θgrid| is within the second threshold T2 (in S10). Here the condition is that T2<T1. With the frequency control the difference between the frequency of the DER system 101 and the frequency of the power grid 107 (|Fder−Fgrid|) decreases so that |θder−θgrid|<T2. If the phase difference |θder−θgrid| is not within the first threshold T1 (NO in S09), it indicates that the cycle has passed and the process will return to S01 to restart the phase and frequency matching process.

If the phase difference |θder−θgrid| is not within the second threshold T2 (NO in S10), the process will return to S07 to keep performing frequency control. If the phase difference |θder−θgrid| is within the second threshold T2 (YES in S10), the threshold calculation unit 904 will send the F-P signal to the switching unit 803. The switching unit 803 controls the switch 109 to reconnect the DER system 101 to the power grid 107 and close the switch 109 when it receives the F-P signal from the power control unit 801, and the voltage signal from the voltage adjustment unit 802.

After sending the F-P signal, the threshold calculation unit 904 will check for an end reconnection signal from the CEMS 116 through the receiving unit 102 (in S12). If the end reconnection signal is received (YES in S12), the process ends. If the end reconnection signal is not received (NO in S12), the process starts again from S01.

The operation of the power reference calculation unit 901 comprises calculating the power reference signal (Pref) from the phase power reference (dPref_phase) as received from the phase control unit 902 and the frequency power reference (dPref_freq) as received from the frequency control unit 903. The Pref control unit 1201 in the power reference calculation unit 901 receives the "phase/frequency control command" from the threshold calculation unit 904. After receiving the "phase control command" the Pref control unit 1201 assigns the value of the phase power reference (dPref_phase) to the power reference correction value (dPref). Conversely, when the threshold calculation unit 904 sends the "frequency control command" the Pref control unit 1201 assigns the value of the frequency power reference (dPref_freq) to the power reference correction value (dPref). The addition circuit 1202 adds the power reference correction value (dPref) to the original power reference (Pref_orig) as received from the CEMS 116 through the receiving unit 102, to output the power reference signal (Pref).

Figure 20:
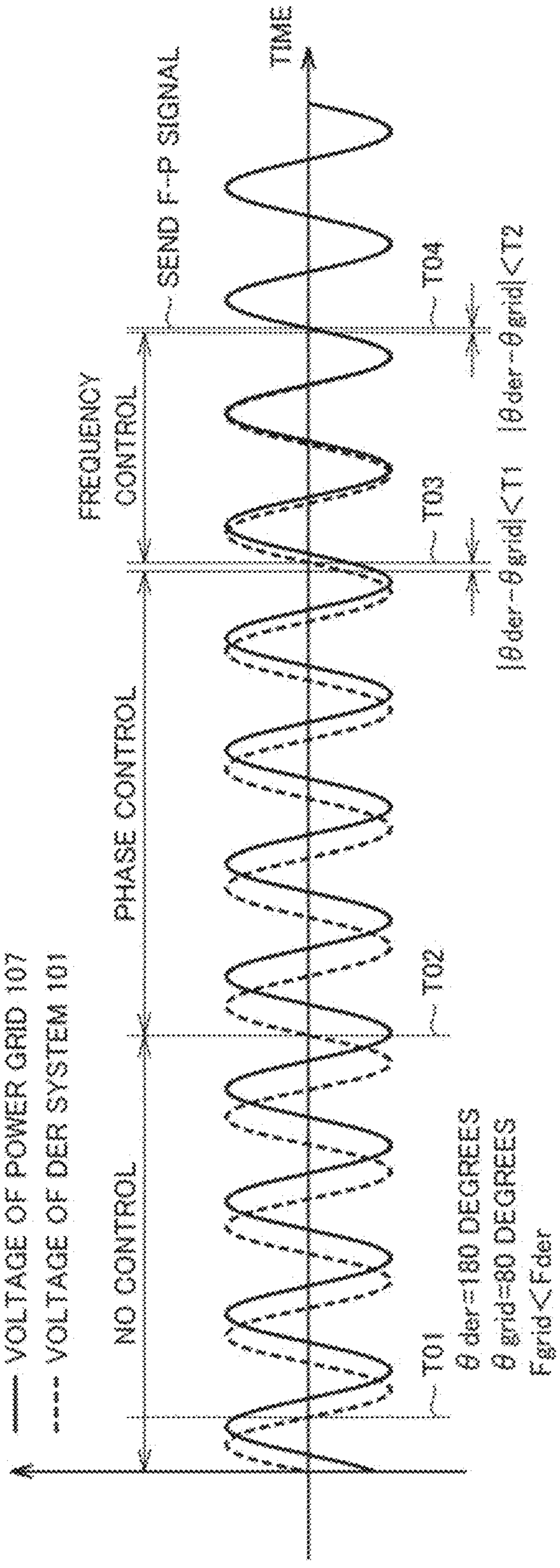
FIG. 20 is a voltage graph of the output voltage of the DER system 101 and the power grid 107 for the application of phase and frequency control through the reconnection control apparatus 104 for the first embodiment.

FIG. 20 provides a control image for an example of the phase and frequency matching operation performed by the power control unit 801. FIG. 20 is a waveform of the voltage of the one of the phases of the DER system 101 as measured by the first detecting unit 105 at point 113 (dotted line) and the voltage of the a-phase of the power grid 107 as measured by the second detecting unit 106 at point 114 (black line). In FIG. 20, the initial conditions (at time (hereafter abbreviated as T) 01) are that the frequency of the DER system 101 is higher than the frequency of the power grid 107 (Fder>Fgrid) and the phase of the DER system 101 is 180 degrees, while the phase of the power grid 107 is around 150 degrees, thus at time T01, the phase of the DER system 101 is leading the phase of the power grid 107 (θder>θgrid).

Analyzing FIG. 20 with the flow chart of FIG. 19, the reconnection signal is received at T02, and thus the operation sequence in FIG. 19 is as follows.

In S02: At T02, Fder−Fgrid≠0, thus it is NO in S02. The operation proceeds to S03.

In S03: At T02, Fder>Fgrid, thus NO in S03. The operation proceeds to S05.

In S05: At T02, θder>θgrid thus YES in S05. The operation proceeds to S06.

In S06: At T02, |θder−θgrid|>T1, thus NO in S06. The operation proceeds to S08.

In S08: The threshold control unit 904 sends a phase control command to the power reference calculation unit 901. As explained above, the power reference calculation unit 901 then modifies the power reference signal (Pref) so that the frequency of the DER system 101 (Fder) is decreased, so that the phase of the DER system 101 (θder) matches the phase of the power grid 107 (θgrid). As (|θder−θgrid|>T1) until T03, the operation remains in S08 until T03. At T03, the difference between the phase of the DER system 101 and the phase of the power grid 107 (|θder−θgrid|<T1) thus YES in S06, so the operation sequence proceeds to S07.

In S07: The threshold control unit 904 sends a frequency control command to the power reference calculation unit 901. The power reference calculation unit 901 then modifies the power reference signal (Pref) so that the frequency of the DER system 101 (Fder) is increased, so that the frequency of the DER system 101 (Fder) matches the frequency of the power grid 107 (Fgrid). As (|θder−θgrid|>T2 and |θder−θgrid|<T1), thus YES in S09 but NO in S10, the operation remains in S08 until T04. With the frequency control being implanted, at T04, the difference between the phase of the DER system 101 and the phase of the power grid 107(|θder−θgrid|<T2 and |θder−θgrid|<T1) thus YES in S09 and YES in S10, so the operation proceeds to S11 at T04.

In S11 the threshold calculation unit 904 sends the F-P signal to the switching unit 803. The operation proceeds to S12.

Figure 21:
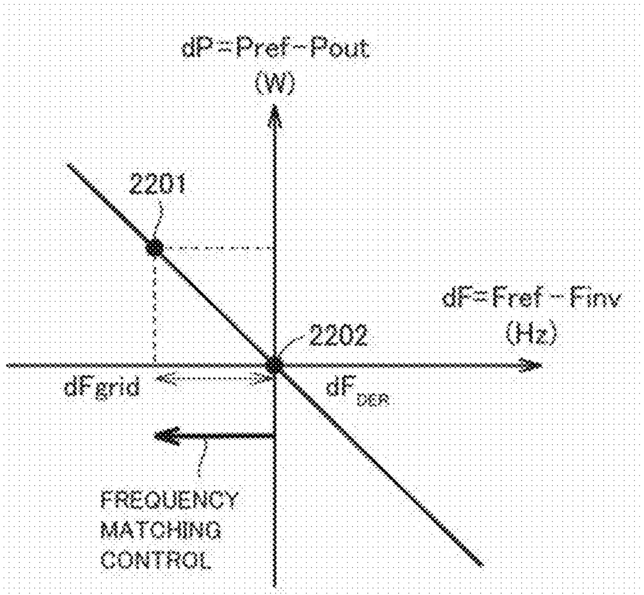
FIG. 21 is a graph describing the droop characteristics with respect to phase and frequency control performed by the reconnection control apparatus 104 with regards to the first embodiment.

Next, the operation of the power reference calculation unit 901 with respect to the droop characteristics is shown in FIG. 21. The power reference calculation unit 901 calculates the power reference signal (Pref) to be sent to the DER system 101 based on the phase and frequency power command values as calculated by the phase control unit 902 and the frequency control unit 903. The effect of the change of power reference signal on the frequency is explained in FIG. 21. The operating point 2202 shows the operating point of the DER system 101 during the independent operation. At the operating point 2202, the DER system 101 usually operates at the frequency given by the frequency reference signal (Fref) through the CEMS 116 through the receiving unit 102, thus in a usual scenario the deviation from the frequency reference is zero. When it is desirable to reconnect to the power grid 107, the reconnection control apparatus 104 performs the phase and frequency matching control to match the phase and the frequency of the voltage of the DER system 101 to the phase and the frequency of the voltage of the power grid 107, by changing the power reference signal (Pref) to the DER system 101. When the power reference signal (Pref) is changed, dP changes, thus moving the operating point from 2202 to 2201.

Next going back to the construction of the reconnection control unit 103 as shown in FIG. 8, the operation of the voltage adjustment unit 802 is described.

The main function of the voltage adjustment unit 802 is to match the amplitude of the voltage of the DER system 101 to the amplitude of the voltage of the power grid 107.

Figure 22:
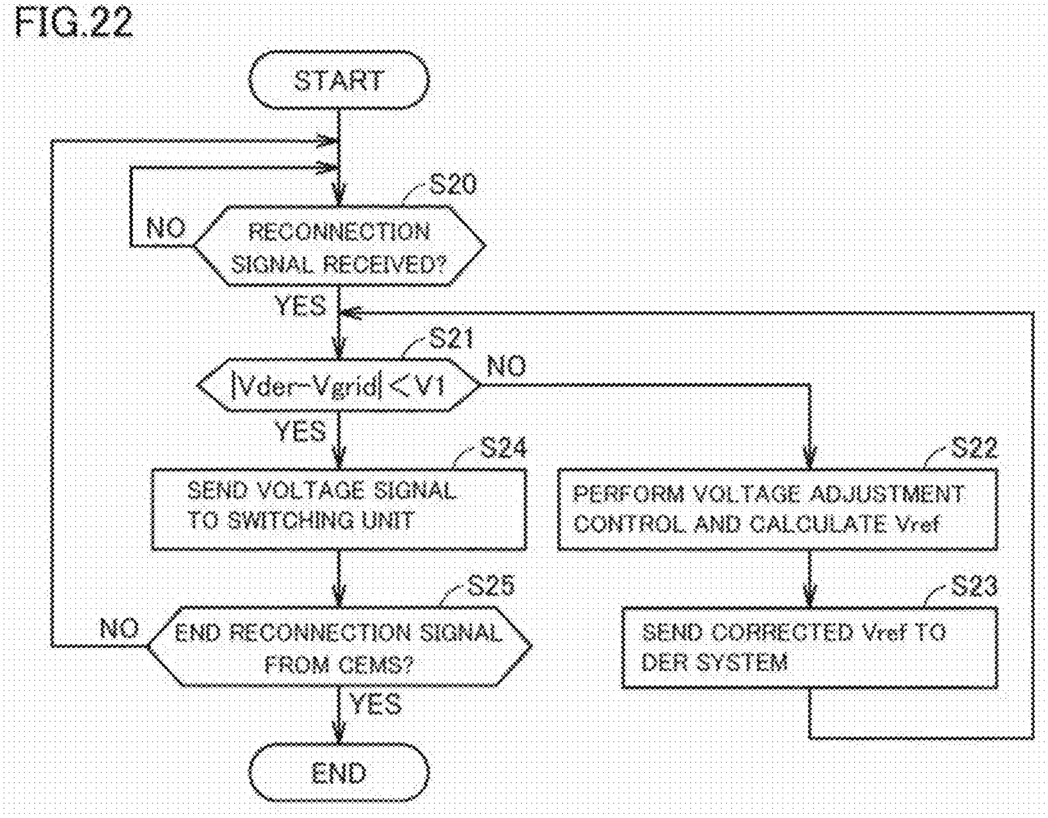
FIG. 22 is a flow chart describing the operation of the voltage adjustment unit 802 described in FIG. 8.

The operation of the voltage adjustment unit 802 is given by the flow chart in FIG. 22 and is explained based on the detailed construction of the voltage adjustment nit 802 as given by FIG. 13. The voltage adjustment unit 802 receives the amplitude of the voltage of the DER system 101 (Vder) at point 113 through the first detection unit 105, and the amplitude of the voltage of the power grid 107 (Vgrid) at point 114 through the second detection unit 106. Based on the amplitude of the voltage of the DER system 101 (Vder) as well as the amplitude of the voltage of the power grid 107 (Vgrid), the voltage adjustment unit 802 calculates the voltage reference signal (Vref) to be given to the DER system 101 to match the amplitude of the voltage of the DER system 101 (Vder) to the amplitude of the voltage of the power grid 107 (Vgrid).

As shown in the flowchart of FIG. 22, step (hereafter abbreviated as S20, the voltage signal unit 1302 confirms if the reconnection signal is received from the CEMS 116 through the receiving unit 102. If the reconnection signal is received (YES in S020), the voltage signal unit 1302 checks if the absolute value of the difference between the voltage amplitude of the DER system 101 (Vder) as received from the first detecting unit 105 and the amplitude of the voltage of the power grid 107 (Vgrid) received from the second detecting unit 106 is within a third threshold (V1) as given by the CEMS 116 ($|Vder-Vgrid|<V1$) in S14.

If the voltage difference is not within the third threshold (V1) (NO in S21), the voltage adjustment unit 802 performs the voltage amplitude control in S22. To perform the voltage amplitude control, the subtractor 1303 calculates the difference between the amplitude of the voltage of the DER system 101 (Vder) and the amplitude of the voltage of the power grid 107 (Vgrid) and sends the result to the third PI block 1301. The third PI block 1301 is a PI controller which calculates the voltage command value (dVref) such that the difference between the amplitude of the voltage of the DER system 101 and the amplitude of the voltage of the power grid 107 is reduced to zero. The voltage command value (dVref) is added to the original voltage reference (Vref_orig) as received from the CEMS 116 through the receiving unit 102 to obtain the voltage reference signal (Vref). The voltage reference signal (Vref) is sent to the DER system 101 in S23. Based on the voltage reference signal (Vref), the DER system 101 adjusts the amplitude of its own voltage (Vder) to match the amplitude of the voltage of the power grid 107 (Vgrid). As long as ($|Vder-Vgrid|>V1$) (NO in S21), the voltage adjustment control is performed in the voltage adjustment unit 802. At a certain time, the absolute difference between the amplitude of the voltage of the DER system 101 and the amplitude of the voltage of the power grid 107 ($|Vder-Vgrid|<V1$) (YES in S21), and the operation moves to S24.

In S24, the voltage signal unit 1302 in the voltage adjustment unit 802 sends a voltage signal to the switching unit 803. The switching unit 803 controls the switch 109 to reconnects the DER system 101 to the power grid 107. The switching unit 803 closes the switch 109 when it receives the F-P signal from the power control unit 801 and the voltage signal from the voltage adjustment unit 802.

After sending the voltage signal to the switching unit 803, the voltage signal unit 1302 checks for the end reconnection signal from the CEMS 116. If the end reconnection signal is received (YES in S25), then the process is ended and if the end reconnection signal is not received (NO in S25), the process begins again from S13.

Figure 23:
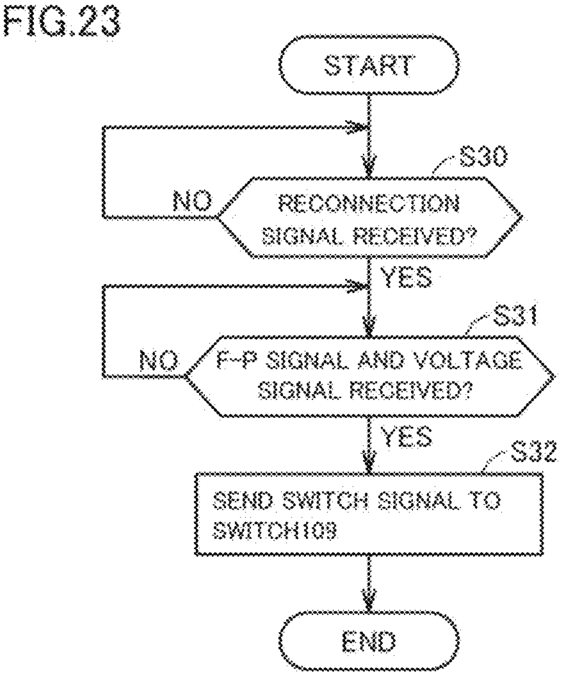
FIG. 23 is a flow chart describing the operation of the switching unit 802 described in FIG. 8.

Next the operation of the switching unit 803 is described briefly. The switching unit 803 is described briefly. The flowchart for the working of the switching unit 803 is given in FIG. 23. In S30, the switching unit 803 confirms the reconnection signal from the CEMS 116. After the reconnection signal is received (YES in S30), the switching unit 803 receives the F-P signal from the power control unit 801 and the voltage signal from the voltage adjustment unit 802. If reconnection signal is not received (NO in S30), the switching unit 803 waits for the reconnection signal. In S31 the switching unit 803 confirms if both the F-P signal and voltage signal are received. If both F-P signal and voltage signal are received (YES in S31), the switching unit 803 sends a switch signal to the switch 109. If both the F-P signal and the voltage signal are not received (NO in S31), the switching unit 803 waits by performing S31 again. After receiving the switch signal the switch 109 is closed, causing the DER system 101 to reconnect to the power grid 107 with matching the phase, the frequency and the amplitude of the voltage at point 113 to the phase, frequency and amplitude of the voltage at point 114 (In S32).

Second Embodiment

Configuration

In the first embodiment, the DER system 101 consists of a single DER unit with a DER. The single DER unit performs the grid-forming VSG control and actively controls the frequency and the amplitude of the output voltage.

When it is desired to reconnect the DER system 101 to the power grid 107 through the switch 109, the DER system 101 receives the power reference signal (Pref) and the voltage reference signal (Vref) from the reconnection control apparatus 104. With the power reference signal (Pref) and the voltage reference signal (Vref), the phase, the frequency and the amplitude of the voltage of the DER system 101 is matched to the phase, the frequency and the amplitude of the voltage of the power grid 107. After matching the phase, the frequency and the amplitude of the voltage on either side of the switch 109, the safe reconnection is implemented.

Figure 24:
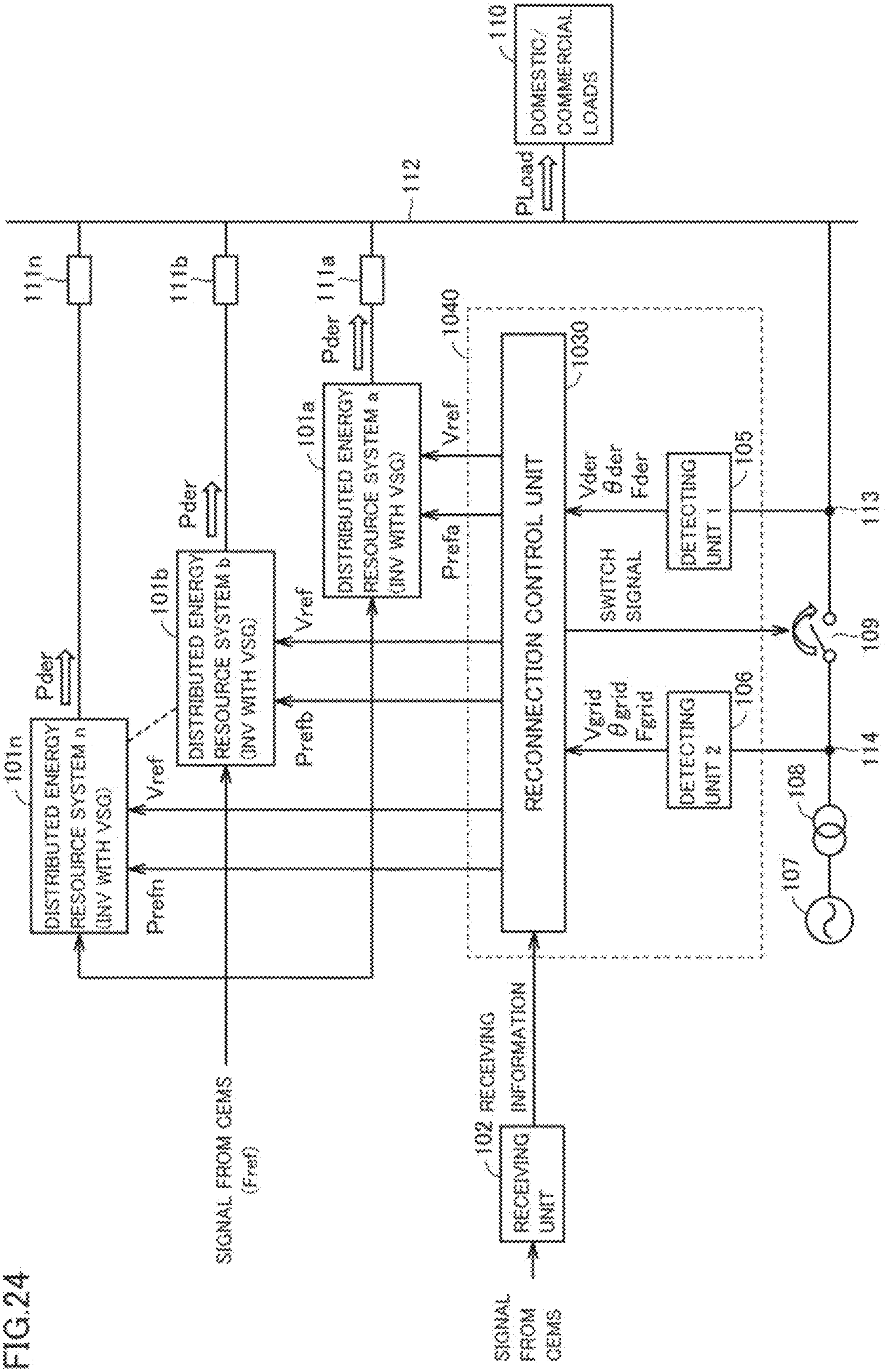
FIG. 24 is a block diagram that shows the entire system with reference to the second embodiment.

FIG. 24 is the block diagram that shows the complete structure of the second embodiment. The second embodiment is different from the first embodiment in that the second embodiment considers multiple DER systems 101*a*~101*n* to be reconnected to the power grid 107 through the switch 109. Hereinafter, the second embodiment will be described, focusing on the portion which is different from the first embodiment.

Similar to the first embodiment, the DER systems 101*a*~101*n* are normally connected to the power grid 107 and supplying power domestic and commercial loads 110. In the event of power outages or malfunction in the operation of the power grid 107, the DER systems 101*a*~101*n* supply power to the domestic and/or commercial loads 110 independently. The multiple DER systems 101*a*~101*n* are connected to the power distribution system 112 through multiple transformers 111*a*~111*n*. The power distribution system 112 is connected to the power grid 107. When the malfunction/fault in the power grid 107 is cleared, it is desirable that the independently functioning DER systems 101*a*~101*n* are reconnected to the power grid 107 through the switch 109. The reconnection control apparatus 1040 detects the phase, the frequency and the amplitude of the voltage at point 113 on the DER systems 101*a*~101*n* side of the switch 109 and the phase, the frequency and the amplitude of the voltage at point 114 on power grid 107 side of the switch 109. To match the phase, the frequency and the amplitude of the voltage on either side of the switch 109, the reconnection unit 1040 sends the voltage reference signal (Vref) and multiple power reference signals (Pref1~Prefn) to the DER systems 101*a*~101*n* respectively. During the time of reconnection, the reconnection control apparatus 1040 gives a signal to close the switch 109 when the phase, the frequency and the amplitude of voltage of the DER systems 101*a*~101*n* through the power distribution system 112 match the phase, frequency and amplitude of voltage of the power grid 107.

The structure of the DER systems 101*a*~101*n* is similar to the DER system 101 described in the first embodiment, in FIG. 3. The explanation will not be repeated here.

The reconnection control apparatus 1040 receives the information of the phase, the frequency and the amplitude of the voltage of the DER system-side of the switch 109 through the first detecting unit 105 and the information of the phase, the frequency and the amplitude of the voltage of the power grid-side of the switch 109 through the second detecting unit 106. The reconnection control apparatus 1040 outputs the voltage reference signal (Vref) and multiple power reference signals (Prefa~Prefn) to the DER systems 101*a*~101*n* respectively. The reconnection control apparatus 1040 also receives the receiving information from the receiving unit 102, as "signal from CEMS 116".

The reconnection control apparatus 104 comprises a reconnection control unit 1030, a first detecting unit 105 and a second detecting unit 106.

Figure 25:
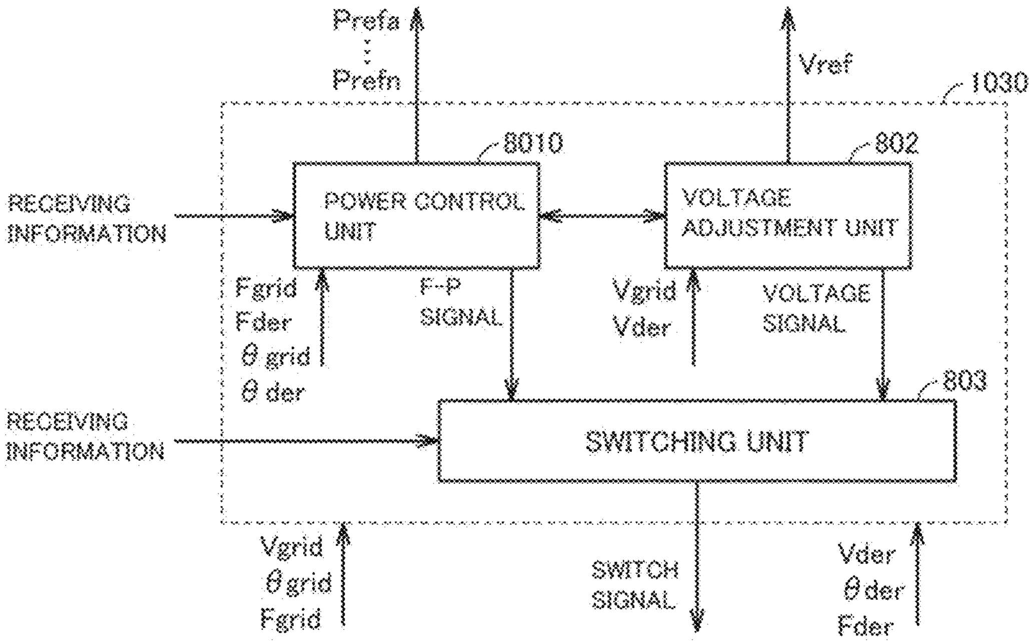
FIG. 25 is a block diagram describing the structure of the reconnection unit as shown in FIG. 24.

The reconnection control unit 1030 comprises a power control unit 8010, a voltage adjustment unit 802 and a switching unit 803. The structure of the reconnection unit 1020 for the second embodiment is given by FIG. 25. The power control unit 8010 inputs the phase and the frequency of the DER systems 101*a*~101*n* as detected by the first detecting unit 105 as well as the phase and the frequency of the power grid 107 as detected by the second detecting unit 106.

The power control unit 8010 also inputs information about permissible thresholds from the receiving unit 102. Based on the inputs, the power control unit 8010 calculates the multiple power reference signals (Prefa~Prefn) to be sent to the DER systems 101*a*~101*n* respectively. The power control unit 8010 also calculates the F-P signal to be sent to the switching unit 803.

The voltage adjustment unit 802 receives the voltage amplitude of the DER systems 101*a*~101*n* as detected by the first detecting unit 105 and the voltage amplitude of the power grid 107 as detected by the second detecting unit 106, and calculates the voltage reference signal (Vref) to be sent to the DER systems 101*a*~101*n*. The voltage adjustment unit 802 also receives information about permissible thresholds and the original voltage reference (Vref_orig) from the receiving unit 102. The voltage adjustment unit 802 also calculates the voltage signal to be sent to the switching unit 803.

Figure 26:
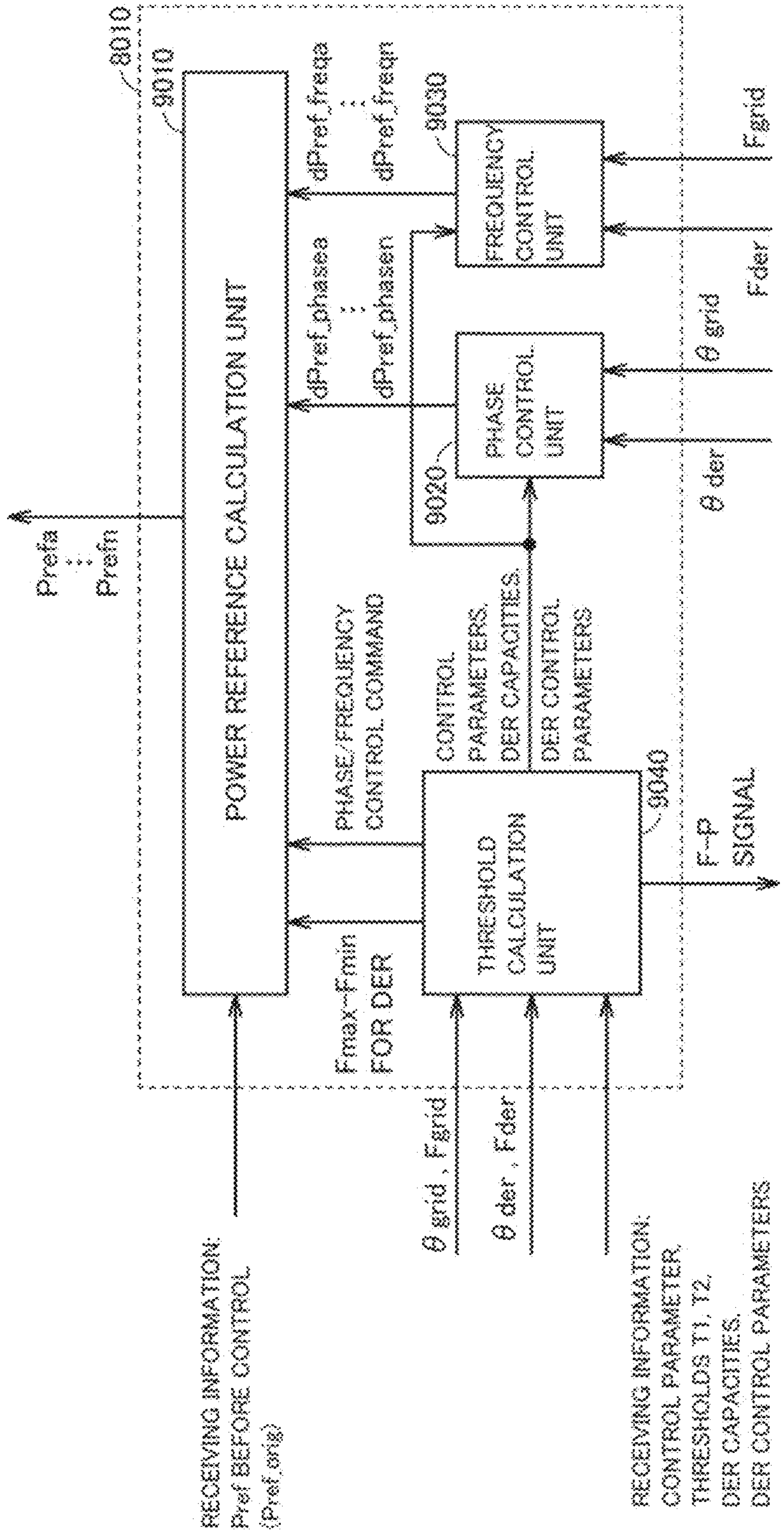
FIG. 26 is a block diagram describing the structure of the power control unit that as shown in FIG. 25.

The general configuration of the power control unit 8010 is given by FIG. 26. The power control unit 8010 comprises a threshold calculation unit 9040, a phase control unit 9020, a frequency control unit 9030, and a power reference calculation unit 9010.

The threshold calculation unit 9040 receives the phase and the frequency of the DER systems 101*a*~101*n* from the first detecting unit 105 and the phase and the frequency of the power grid 107 from the second detecting unit 106. The threshold calculation unit 9040 also receives the receiving information from the receiving unit 102. The information received from the receiving unit 102 comprises information from the CEMS 116 about the control parameters, thresholds, nominal capacities of the DER systems 101*a*~101*n* and the control parameters of the DER systems 101*a*~101*n*.

The threshold calculation unit 9040 calculates the safe range of frequency (Fmax−Fmin) and outputs it to the power reference calculation unit 9010. The threshold calculation unit 9040 also calculates the control parameters based on the information received from the receiving unit 102 and sends it to the phase control unit 9020 and the frequency control unit 9030.

Based on the difference between the phase of the voltage of the DER systems 101*a*~101*n* at point 113 and the phase of the power grid 107 at point 114, the threshold calculation unit 9040 calculates the phase/frequency control command signal to be sent to the power reference calculation unit 9010. Based on the difference between the phase and frequency of the DER systems 101*a*~101*n* at point 113 and the phase and frequency of the power grid 107 at point 114, the threshold calculation unit 9040 calculates the F-P signal to be sent to the switching unit 803.

The phase control unit 9020 receives the control parameters from the threshold unit 9040 and the phase of the DER systems 101*a*~101*n* (θder) at point 113 from the first detecting unit 1 105 and the phase of the power grid 107 (θgrid) at point 114 from the second detecting unit 106. Based on the received information, the phase control unit 9020 calculates the multiple phase power references (dPref_phasea~dPref_phasen) and sends them to the power reference calculation unit 9010.

The frequency control unit 9030 receives the control parameters from the threshold unit 9040 and the frequency of the DER systems 101*a*~101*n* (Fder) at point 113 from the first detecting unit 105 and the frequency of the power grid 107 (Fgrid) at point 114 from the second detecting unit 106. Based on the received information, the frequency control unit 9030 calculates the multiple frequency power references (dPref_frequencya~dPref_frequencyn) and sends them to the power reference calculation unit 9010.

The power reference calculation unit 9010 receives the multiple original power references (Pref_origa~Pref_orign) from the receiving unit 102, the safe range of frequency (Fmax–Fmin) and the phase/frequency control command from the threshold calculation unit 9040 and the multiple phase power references (dPref_phasea~dPref_phasen) from the phase control unit 9020 and the multiple frequency power references (dPref_frega~dPref_freqn) from the frequency control unit 9030. Based on the inputs the power reference calculation unit 9010 calculates the multiple power reference signals (Prefa~Prefn) to be sent to the DER systems 101*a*~101*n* respectively.

Figure 27:
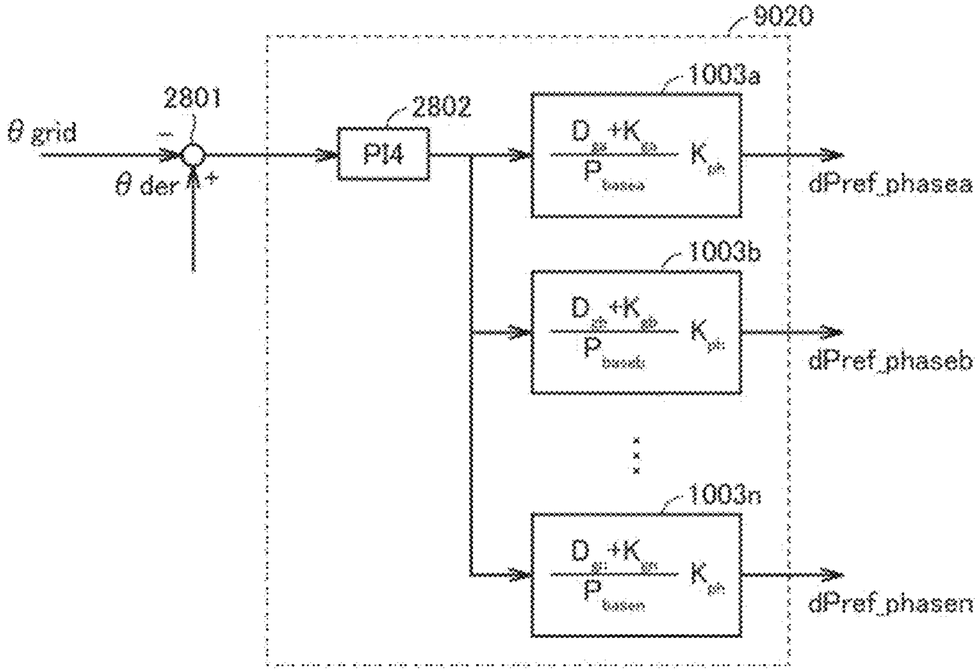
FIG. 27 is a block diagram describing the structure of the phase control unit that as shown in FIG. 26.

The general configuration of a phase control unit 9020 is given by FIG. 27.

The inputs to the phase control unit 9020 are the phase of the DER systems 101*a*~101*n* (θder) at point 113 and the phase of the power grid 107 (θgrid) at point 114. The subtractor 2801 calculates a difference between the phase of the power grid 107 at point 114 and the phase of the DER system 101*a*~101*n* at point 113 (θder–θgrid). The result of the subtractor 2801 is given to the fourth PI block 2802 which is a PI controller unit. The fourth PI block 2802 implements a PI control based on the control parameters received from the threshold calculation unit 9040 and generates a result which is given to the multiple proportional gain circuits 1003*a*~1003*n*. The multiple proportional gain circuits 1003*a*~1003*n* calculate the phase power references (dPref_phasea~dPref_phasen) to be sent to the power reference calculation unit 9010. The multiple proportional gain circuits 1003*a*~1003*n* correspond to the respective DER systems 101*a*~101*n* and calculate the phase power references (dPref_phasea~dPref_phasen) based on the control parameters and the nominal capacities (Pbasea~Pbasen) of the DER systems 101*a*~101*n* respectively and a common gain constant Kph. The control parameters include the damping co-efficient (Dga~Dgn) and the governor gains (Kga~Kgn) for the DER systems 101*a*~101*n* respectively.

Figure 28:
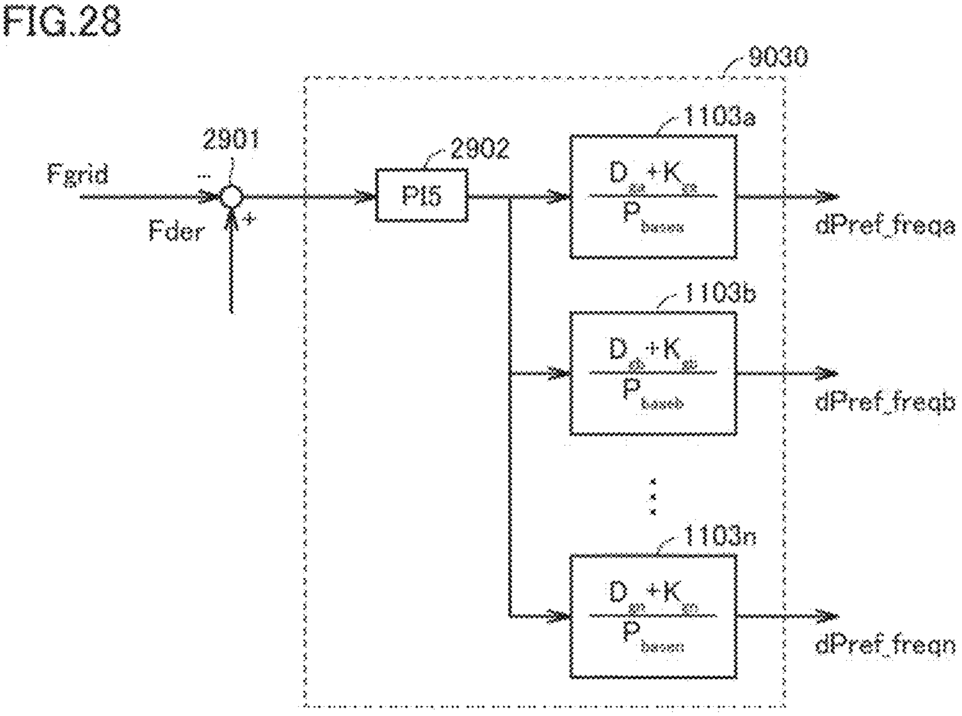
FIG. 28 is a block diagram describing the structure of the frequency control unit that as shown in FIG. 26.

The general configuration of a frequency control unit 9030 is given by FIG. 28. The inputs to the frequency control unit 9030 are the frequency of the DER systems 101*a*~101*n* (Fder) at point 113 and the frequency of the power grid 107 (Fgrid) at point 114. The subtractor 2901 calculates a difference between the frequency of the power grid 107 at point 114 and the frequency of the DER systems 101*a*~101*n* at point 113 (Fder–Fgrid). The result of the subtractor 2901 is given to the fifth PI block 2902 which is a PI controller unit. The fifth PI block 2902 implements a PI control based on the control parameters received from the threshold calculation unit 9040 and generates a result which is given to the multiple proportional gain circuits 1103*a*~1103*n*. The multiple proportional gain circuits 1103*a*~1103*n* calculate the frequency power references (dPref_frega~dPref_freqn) to be sent to the power reference calculation unit 9010. The multiple proportional gain circuits 1003*a*~1003*n* correspond to the respective DER systems 101*a*~101*n* and calculate the frequency power references (dPref_frega~dPref_freqn) based on the control parameters and the nominal capacities (Pbasea~Pbasen) of the DER systems 101*a*~101*n* respectively. The control parameters include the damping co-efficient (Dga~Dgn) and the governor gains (Kga~Kgn) for the DER systems 101*a*~101*n* respectively.

Figure 29:
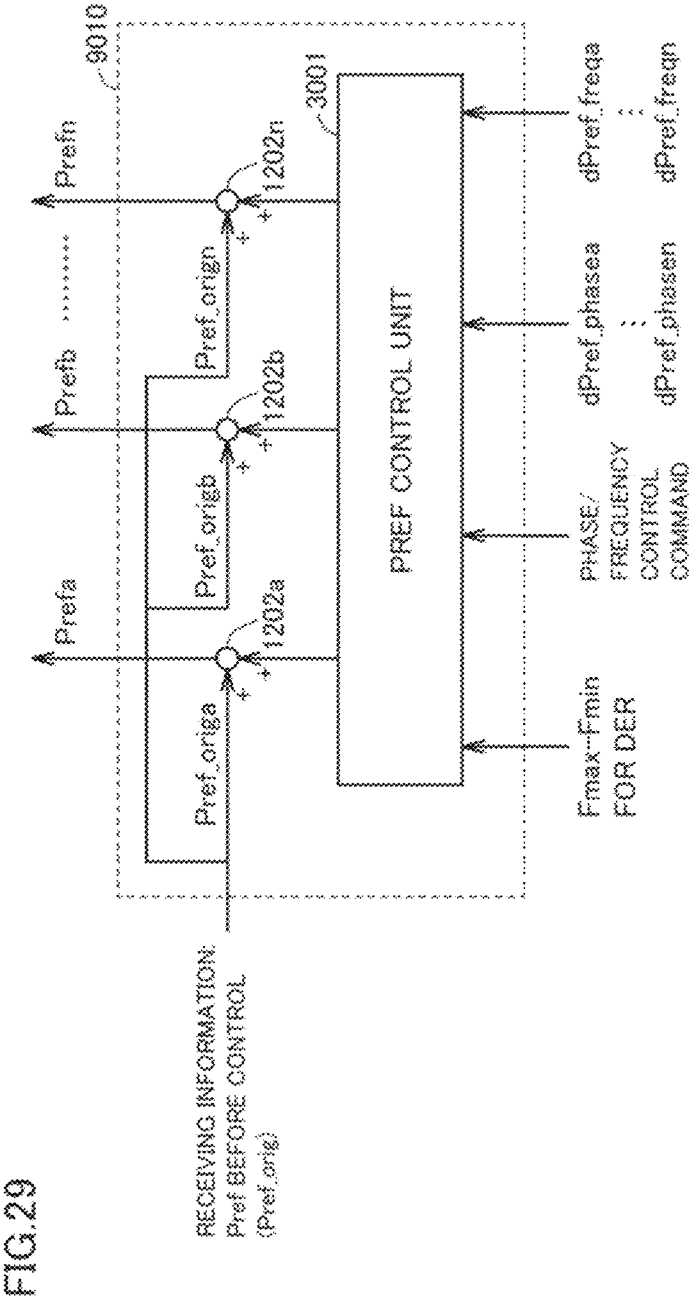
FIG. 29 is a block diagram describing the structure of the power reference calculation unit that as shown in FIG. 26.

The general configuration of the power reference calculation unit 9010 is given by FIG. 29. The power reference calculation unit 9010 comprises a Pref control unit 3001 and multiple addition circuits 1202*a*~1202*n*. The Pref control unit 3001 receives the multiple phase power references (dPref_phasea~dPref_phasen) from the phase control unit 9030 and the multiple frequency power reference (dPref_frega~dPref_freqn) from the frequency control unit 9030. The Pref control unit 3001 also receives the phase/frequency control command and the safe range of frequency (Fmax–Fmin) from the threshold calculation unit 9040.

The Pref control unit 3001 calculates and outputs multiple power reference correction values (dPrefa~dPrefn) based on the multiple phase power references (dPref_phasea~dPref_phasen) and the multiple frequency power reference (dPref_frega~dPref_freqn) according to the phase/frequency control command. The Pref control unit 3001 also limits the power reference correction values (dPrefa~dPrefn) so that the frequency of the DER systems 101*a*~101*n* (Fder) at point 113 is kept within the safe range of frequency (Fmax–Fmin) as given by the threshold calculation unit 9040. The multiple addition circuits 1202*a*~1202*n* add the respective power reference correction value (dPrefa~dPrefn) to the corresponding original power reference (Pref_origa~Pref_orign) to calculate the corresponding multiple power reference signals (Prefa~Prefn) which are sent to the DER systems 101*a*~101*n* respectively. For example corresponding to DER system 101*a*, the power reference correction value dPrefa is calculated using the phase/frequency power reference (dPref_phasea/dPref_frega) based on the phase/frequency command by the threshold command unit 9040 and added to the original power reference (Prefa_orig) by addition circuit 1202*a* to obtain the power reference signal (Prefa) to be sent to the DER system 101*a*. A similar structure is assumed for the other multiple DER units 101*b*~101*n*.

Operation

Similar to the first embodiment, the DER systems 101*a*~101*n* of the second embodiment are virtual synchronous generators with a governor control. The detailed structure of the DER systems 101*a*~101*n* is given by FIG. 4. Here, the VSG control unit 404 will carry out the operation of the governor control as well as the operation of imitating the inertial behavior according to the swing equation. Each DER system 101*a*~101*n* is considered to have a nominal capacity given by Pbasea~Pbasen respectively. Each of the DER systems 101*a*~101*n* has a damping co-efficient Dga~Dgn respectively and a governor gain Kga~Kgn respectively. Thus, the nominal capacity and the control parameters of each DER system are unique.

For multiple DER systems 101*a*~101*n* connected to the same power distribution system 112 and supplying to common loads (domestic/commercial loads) 110, the output frequency for each DER systems 101*a*~101*n* will converge to a common frequency (Fder). The output power of each DER systems 101*a*~101*n* is calculated by the power calculation unit 403 is denoted by "Pouta~Poutn".

Figure 30:
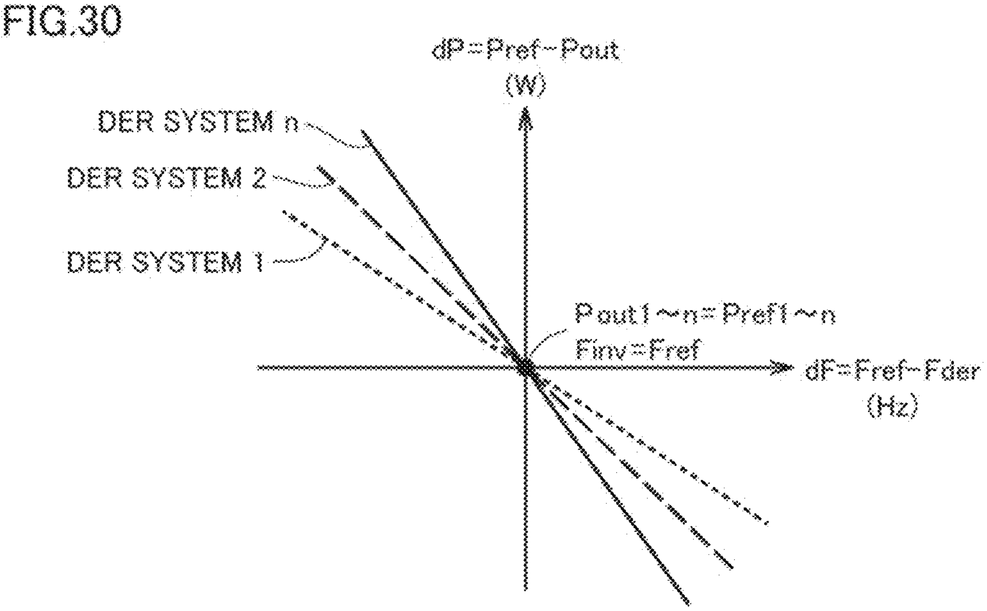
FIG. 30 is a graph showing the steady state relation between dF (Fref−Fder) and dP (Pref-Pout) is given for multiple DER systems 101*a*~101*n* given in FIG. 25 for the second embodiment.

The steady state relation between dF (Fref–Fder) and dP (Pref–Pout) for multiple DER systems 101*a*~101*n* is given by FIG. 30. An example of FIG. 30 shows the droop characteristics (dP-dF) of three DER systems: the DER system 101*a*, the DER system 101*b* and the DER system 101*n*. The horizontal axis gives dF which is the deviation of the inverter frequency (Fder) from frequency reference signal (Fref) as obtained from the CEMS 116 through the receiving unit 102, and the vertical axis gives dP which is a deviation of the output power of the DER systems 101*a*~101*n* as calculated by the corresponding power calculation unit 403 from the corresponding power reference signal (Pref1*a*~Prefn) as calculated by the reconnection control apparatus 1040. The slope of the linear graph for each DER systems 101*a*~101*n* is dependent on the nominal capacity (Pbasea~Pbasen), and the governor gain (Kga~Kgn) as well as the damping co-efficient Dga~Dgn of the VSG control. As the DER systems 101*a*~101*n* operate at a common frequency (Fder), when Fder equals to the frequency reference signal (Fref) as obtained from the CEMS 116, the DER systems 101*a*~101*n* output power equal to power corresponding to the power reference signal (Prefa~Prefn), thus Pouti=Prefi when Fder=Fref where "i" is indexed from a~n.

The steady state relationship between dP and dF is given by Equation (3) is given by Equation (4).

[Math. 4]

$$dPi = \frac{P_{basei}}{D_{gi} + K_{gi}} dF \quad (4)$$

Here "i" is indexed from a to n for the corresponding DER systems 101*a*~101*n*.

To change the frequency of the DER systems 101*a*~101*n* from the frequency reference signal (Fref) to a different frequency (for example F1, in FIG. 31), it is necessary to change the power reference signals (Prefa~Prefn), such that the deviation of the output power of the DER systems 101*a*~101*n* from the reference power signal (Prefa~Prefn), i.e dPa~dPn needs satisfy Equations (5) and (6).

[Math. 5]

$$\chi\_a\ dPa = \chi\_b\ dPb = \chi\_n\ dPn \quad (5)$$

$$\chi\_i = (D\_gi + K\_gi)/P\_basei,\ dPi = Prefi - Pouti \quad (6)$$

Figure 31:
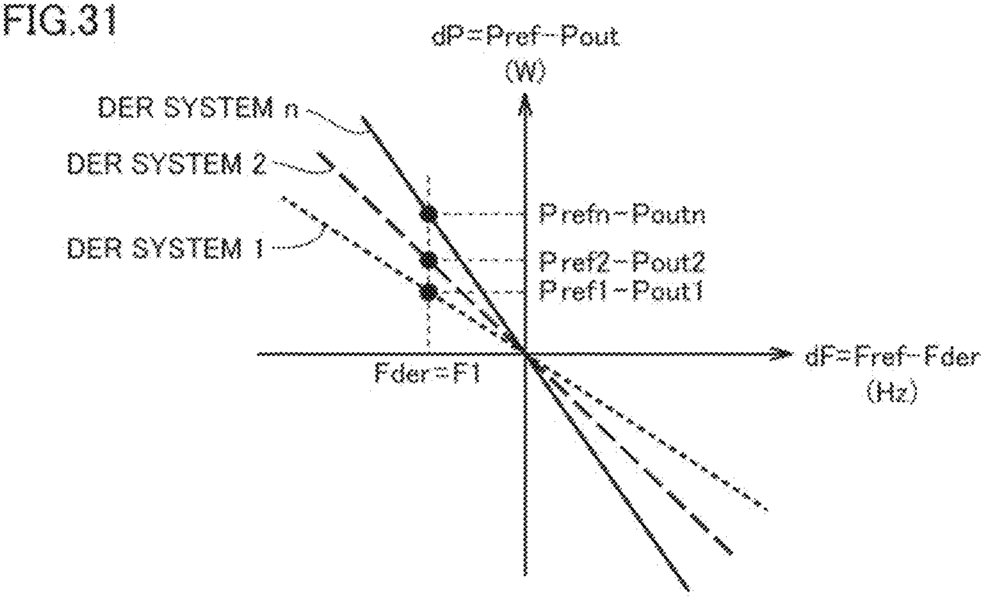
FIG. 31 is a graph showing the steady state relation between dF (Fref−Fder) and dP (Pref-Pout) for multiple DER systems 101*a*~101*n* when operating at a frequency different that the frequency given by the frequency reference signal (Fref).

Thus, to change the frequency of the DER system 101*a*~101*n* (Fder) at point 113, the reconnection control unit 1040 calculates the power reference signal (Prefa~Prefn) to be sent to the DER systems 101*a*~101*n*. The steady state relation between dF (Fref–Fder) and dP (Pref–Pout) is given for the multiple DER systems 101*a*~101*n* when operating at a frequency different from the frequency given by the frequency reference signal (Fref). Similar to FIG. 30, FIG. 31 shows the droop characteristics (dP-dF) of three DER systems: the DER system 101*a*, the DER system 101*b* and the DER system 101*n*. In this case as the operating frequency is shifted from the reference frequency as given by the frequency reference signal (Fref), the deviation of the output power of the DER systems 101*a*~101*n* from the power reference signals (Prefa~Prefn) (dPa~dPn) varies according to the steady state characteristics as given by Equation (4), (5).

When the DER systems 101*a*~101*n* with droop characteristics as shown in FIG. 31 implementing the VSG control are to be reconnected to the power grid 107 through the switch 109, it is desirable to match the phase, the frequency and the amplitude of the voltage at point 113 on the DER system-side to the phase, the frequency and amplitude of the voltage at point 114 on the power grid-side. The operating frequency of all the DER systems 101*a*~101*n* at point 113 can be changed by changing the power reference signals (Pref1~Prefn) through the reconnection control apparatus 1040.

Figure 32:
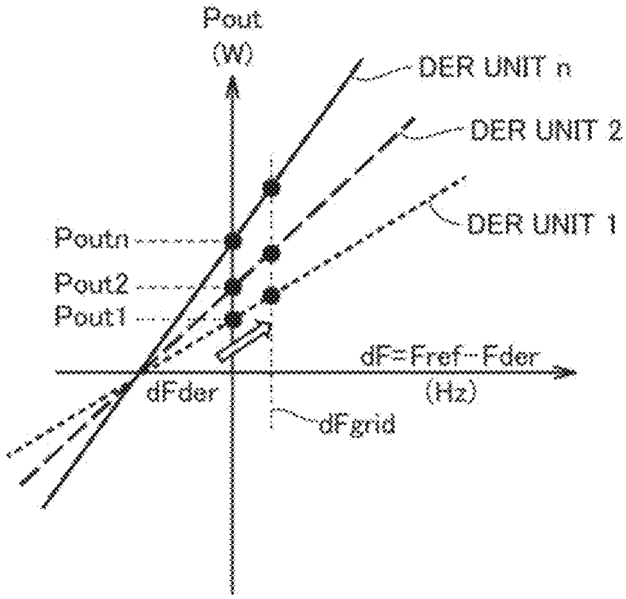
FIG. 32 is a graph showing the droop characteristics of DER systems 101*a*~101*n* with respect to the power output (in Watts) and the frequency deviation from the reference frequency.

FIG. 32 shows the droop characteristics of the multiple DER systems 101*a*~101*n* with respect to the output of the DER system 101*a*~101*n* (in watts) and the deviation of the frequency of the DER systems 101*a*~101*n* at point 113 from the reference frequency as given by the frequency reference signal (Fref) by the CEMS 116 (dF=Fref–Fder). Before reconnection to the power grid 107, the DER systems 101*a*~101*n* are operating at the reference frequency (Fder=Fref, thus dFder=0) at point 113, and the outputs of the DER systems 101*a*~101*n* are given by Pouta~Poutn. The deviation of the frequency of the power grid (Fgrid) from the reference frequency (Fref) as given by the CEMS 116 is given by dFgrid (dFgrid=Fref–Fgrid). To reconnect to the power grid 107, it is desirable to change the frequency of the DER systems 101*a*~101*n* at point 113 to match the frequency of the power grid 107 (Fgrid) by changing Pref. If the switch 109 is closed without the frequency matching by changing the power reference signals (Prefa~Prefn), then, as the capacity of the power grid 107 is much higher than the total capacity of all the DER systems 101*a*~101*n*, the output power of each DER system 101*a*~101*n* will increase to accommodate the change in frequency. This may cause one or more DER systems 101*a*~101*n* to go above their nominal capacity, depending on the nominal capacity (Pbasea~Pbasen) and the control parameters of the VSG control (Dga~Dgn,Kga~Kgn), i.e the slope of the droop characteristics as shown in FIG. 32.

Figure 33:
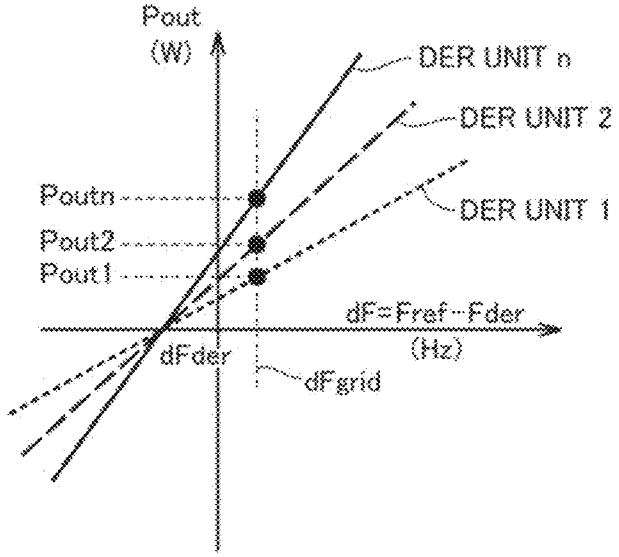
FIG. 33 is a graph showing the droop characteristics of DER systems 101*a*~101*n* with respect to the power output (in Watts) and the frequency deviation from the reference frequency when the frequency of the DER systems is changed by changing the power reference signal (Pref).

FIG. 33 shows a graph of the droop characteristics (dP-dF) of the same three DER systems 101*a*, 101*b*, 101*n*. In this case, the power reference signal as calculated by the reconnection control apparatus 1040 and sent to the corresponding DER systems is changed based on the nominal capacities (Pbasea~Pbasen) and the control parameters of the VSG control (Dga~Dgn,Kga~Kgn). The power reference signals are calculated such that the frequency of the DER systems 101*a*~101*n* at point 113 matches the frequency of the power grid 107, and the power outputs (Pouta~Poutn) of the DER systems 101*a*~101*n* remain unchanged. Thus, by knowing the information of the nominal capacities and the control parameters for the VSG control, it is possible to match the frequency of the DER systems 101*a*~101*n* at point 113 without changing the output power of each of the DER system 101*a*~101*n*.

Next the operation of the reconnection control apparatus is explained with respect to the second embodiment. The reconnection control apparatus comprises two detecting units, the first detecting unit 105 and the second detecting unit 106 to measure the phase, the frequency and the amplitude of the voltage at point 113 and the phase, the frequency and the amplitude of the voltage at point 114, and the reconnection control unit 1030. The working of the reconnection control apparatus 1040 mainly concerns the operation of the reconnection control unit 1030.

The details of the reconnection control unit 1030 are provided in FIG. 8. From FIG. 25, it can be seen that the reconnection control unit 1030 performs the operation of the phase and frequency matching control through the power control unit 8010 and the amplitude matching control through the voltage adjustment unit 802. The switching unit 803 is responsible for the switching of the switch 109 based on signals received from the power control unit 8010 and the voltage adjustment unit 802. The operation of the reconnection unit 1030 is explained briefly by explaining the operating conditions and the operating sequences of the power control unit 8010 for the second embodiment.

The operating sequence of the power control unit 8010 of the second embodiment is similar to that of the first embodiment, and the differences from the first embodiment are elaborated herein. The general operation of the power control unit 1030 is similar to that of the first embodiment and can be explained by the flowchart given in FIG. 19. The difference from the first embodiment is the actual process of the phase and frequency control as carried out by the phase control unit 9020 and the frequency control unit 9030. This will be explained herein.

The power reference calculation unit 9010 receives the phase control command as the "phase/frequency control command" from the threshold calculation unit 9040. The power reference calculation unit 9010 calculates the power reference signals (Prefa~Prefn) to be sent to the DER systems 101*a*~101*n* based on the multiple phase power references (dPref_phasea~dPref_phasen) as obtained from the phase control unit 9020 to execute the phase control through all DER systems 101*a*~101*n* to match the phase of the DER system 101*a*~101*n* (θder) at point 113 to the phase of the power grid 107 (θgrid) at point 114.

As shown in FIG. 29 (construction of the power reference calculation unit 9010 with respect to the second embodiment), the power reference correction values (dPrefa~dPrefn) corresponding to the multiple DER systems 101*a*~101*n* are added to the original power references (Pref_origa~Pref_orign) of the same DER unit through the addition circuits 1202*a*~1202*n* respectively, as received from the CEMS 116, and the power references (Prefa~Prefn) are generated.

The multiple power references (Prefa~Prefn) are sent to the corresponding DER system 101*a*~101*n* to change the frequency of the DER systems 101*a*~101*n* (Fder) at point 113. Thus, by generating power references (Prefa~Prefn) corresponding to the difference between the phase of the DER systems at point 113 and the phase of the power grid 107 at point 114 (θder−θgrid), the phase matching control is performed.

The phase power references (dPref_phasea~dPref_phasen) are generated in the phase control unit 9020. The operation of the phase control unit 9020 can be understood with the help of FIG. 27. The phase control unit 9020 receives the input of the phase of the DER systems 101*a*~101*n* (θder) at point 113 from the first detecting unit 105 and the phase of the power grid 107 (θgrid) at point 114 from the second detecting unit 106. The subtractor 2701 calculates the difference between the phase of the DER system 101 (θder) and the phase of the power grid 107 (θgrid) and the output of the subtractor 2801 is sent to the fourth PI block 2802.

The fourth PI block 2802 is a PI controller that calculates the error signal such that the difference between the phase of the DER systems 101*a*~101*n* (θder) and the phase of the power grid 107(θgrid) is reduced to zero. The fourth PI block 2802 receives the control parameters from the CEMS 116 through the threshold calculation unit 9040. The error signal generated by the fourth PI block 2802 is given to the multiple proportional gain units 1003*a*~1003*n* corresponding to the DER systems 101*a*~101*n* respectively. The error signal obtained from the fourth PI block 2802 is scaled by the multiple proportional gain units 1003*a*~1003*n* corresponding to the Equation (5), and another proportional constant (Kph) to scale the effects of frequency change to control the phase of the DER systems 101*a*~101*n* at point 113. By scaling the error signal from the forth PI block 2802 through the proportional gain blocks 1003*a*~1003*n* it is possible to change the phase of the DER systems 101*a*~101*n* at point 113 such that all the DER systems 101*a*~101*n* simultaneously change the frequency without changing the output powers (Pouta~Poutn) and thus making sure that all of the DER systems 101*a*~101*n* do not try to output power more than their nominal capacities (Pbasea~Pbasen). Thus, by implementing a proportional change in the power reference signal based on the nominal capacities (Pbasea~Pbasen) and the control parameters as given by FIG. 27 and Equation (5), the output power is maintained while performing the phase control through the phase control unit 9020.

Similar to the phase control, when the power reference calculation unit 9010 receives the frequency control command from the threshold calculation unit 9040, the power reference calculation unit 9010 assigns the frequency power references (dPref_frega~dPref_freqn) to the power reference correction values (dPrefa~dPrefn) respectively, in order to match the frequency of the DER systems 101*a*~101*n* at point 113 (Fder) to the frequency of the power grid 107 at point 114.

As shown in FIG. 29 (construction of the power reference calculation unit 9010 with respect to the second embodiment), the power reference correction values (dPrefa~dPrefn) corresponding to the multiple DER systems 101*a*~101*n* are added to the original power references (Pref_origa~Pref_orign) of the same DER unit through the addition circuits 1202*a*~1202*n* respectively, as received from the CEMS 116, and the power references (Prefa~Prefn) are generated. In the case for the frequency control the power references (Prefa~Prefn) are sent to the corresponding DER systems 101*a*~101*n*, such that the frequency of the DER systems 101*a*~101*n* at point 113 (Fder) matches the frequency of the power grid at point 114 (Fgrid).

The frequency power references (dPref_frega~dPref_freqn) are generated in the frequency control unit 9030. The operation of the frequency control unit 9030 can be understood with the help of FIG. 28. The frequency control unit 9030 receives the input of the frequency of the DER systems 101*a*~101*n* (Fder) at point 113 from the first detecting unit 105 and the frequency of the power grid 107 (Fgrid) at point 114 from the second detecting unit 106. The subtractor 2901 calculates the difference between the frequency of the DER system 101 (Fder) and the frequency of the power grid 107 (Fgrid) and the output of the subtractor 2901 is sent to the fifth PI block 2902.

The fifth PI block 2902 is a PI controller that calculates the error signal such that the difference between the frequency of the DER systems 101*a*~101*n* (Fder) and the frequency of the power grid 107 (Fgrid) is reduced to zero. The fifth PI block 2902 receives the control parameters from the CEMS 116 through the threshold calculation unit 9040. The error signal generated by the fifth PI block 2902 is given to the multiple proportional gain units 1103*a*~1103*n* corresponding to the DER systems 101*a*~101*n* respectively. The error signal obtained from the fifth PI block 2902 is scaled by the proportional gain units 1003*a*~1003*n* corresponding to the Equation (5). By scaling the error signal from the fifth PI block 2902 through the proportional gain blocks 1103*a*~1103*n* it is possible to change the frequency of the DER systems 101*a*~101*n* at point 113 such that all the DER systems 101*a*~101*n* simultaneously change the frequency without changing the output powers (Pouta~Poutn), and thus making sure that all of the DER systems 101*a*~101*n* do not try to output power more than their nominal capacities (Pbasea~Pbasen). Thus, by implementing a proportional change in the power reference signal based on the nominal capacities (Pbasea~Pbasen) and the control parameters as given by FIG. 28 and Equation (5), the output power is maintained while performing frequency control through the frequency control unit 9030.

The DER system 101 for the first embodiment is considered to be a DER with DC source 301 with an inverter 302, controlled by an inverter control unit 304 performing the VSG control. Even though it is not described in the first embodiment, the DER system 101 can be any inverter based resource (IBR), i.e with a grid forming control possessing with (dF-dP) droop characteristics and being able to change the inverter frequency (Fder) by changing the power reference signal (Pref), or even a conventional synchronous generator. Similarly, for the second embodiment, the DER systems 101*a*~101*n* are all described to be a DER with DC source 301 with a inverter 302, controlled by an inverter control unit 304 performing the VSG control, but without loss of generality, the multiple DER systems 101*a*~101*n* may not be similar, and could comprises single or multiple other IBRs with other grid forming control with (dF-dP) droop characteristics and being able to change the inverter frequency (Fder) by changing the power reference signal (Pref), or even a conventional synchronous generator.

In the first and second embodiments, the DER system 101 is described to be a DER with DC source 301 with an inverter 302 controlled by an inverter control unit 304 performing the VSG control. The VSG control unit 404 described in the first and second embodiments performs he governor control as well as the VSG control. Though it is not mentioned in the first and second embodiments, the VSG control unit 404 may be performing only the VSG control (without the governor control).

In the first and second embodiments the DER system 101 provides the power to the domestic/commercial loads 110 in the event of a fault or power out of the power grid 107. Even though it is not described in the first and second embodiments, the loads supplied by the DER system 101 in the independent operation mode may be only some or all of the loads considered to be domestic/commercial load 110*s*. Thus it is possible for the DER system 101 to provide the power to only some loads deemed critical in the event of independent operation.

In the first embodiment, a single DER system 101 having the grid forming control abilities (i.e single master DER system), i.e the VSG control is considered, but it can be a single or multiple DER systems with the grid following control (single or multiple slave DER systems). Similarly, in the second embodiment, multiple DER systems with the grid forming control abilities (multiple master DER systems) are considered, but the similar operation can be described for the multiple grid forming inverters and a single or multiple grid following inverters (multiple master DER systems, single or multiple slave DER systems).

Further, in the first and second embodiments, the voltage reference signal (Vref) is calculated in the voltage adjustment unit 802 by calculating the difference between the amplitude of the voltage at point 113 and the amplitude of the voltage at point 114 and then using a PI controller. The method for controlling the amplitude of the voltage of the DER system at point 113 is not limited to the one explained in the first and second embodiments but can also be done through a reactive power reference command through the application of QV control, utilizing the (dQ-dV) droop characteristics.

In the first and second embodiments, in order to make the description easier understand, a case has been described in which control circuits of the DER system 101 are configured by hardware (H/W) as illustrated in FIGS. 1 to 15. However, even if a function of each block or some blocks described in each block is achieved by software (S/W) implemented on a central processing unit (CPU), a similar control function can be achieved. Alternatively, it is also possible to achieve a similar control function by a function division of software and hardware for at least some blocks.

It is to be understood that the embodiments that have been disclosed herein are not restrictive, but are illustrative in all respects. The scope of the present disclosure is defined not by the description above but by the claims, and it is intended to include all modifications within the meaning and scope equivalent to the claims.

REFERENCE SIGNS LIST

101, 101*a*~101*n*: DER system; 102: receiving unit; 103: reconnection control unit; 104: reconnection control apparatus; 105: first detecting unit; 106: second detecting unit; 107: power grid; 108: first distribution transformer; 109: switch; 110: domestic/commercial loads; 111: distribution impedance; 112: power distribution system; 113: DER system-side of switch; 114: power grid system-side of switch; 116: CEMS; 201: first transformer; 202: second transformer; 203: apartment building loads; 204: hospital; 205: lighting loads; 206: commercial loads; 301: DER with DC source; 302: Inverter; 303: third transformer; 304: inverter control unit (inverter controller); 305: current and voltage detector; 401: AC frequency detecting unit (AC frequency detector); 402: voltage command calculation unit (voltage command calculator); 403: power calculation unit (power calculator); 404: VSG control unit (VSG controller); 406: gate pulse generation unit (gate pulse generator); 501: subtractor; 502: governor control unit (governor controller); 503: addition circuit; 504: subtractor; 505: main VSG control unit (main VSG controller); 601: voltmeter; 602: phase detector; 603: frequency detector; 701: voltmeter; 702: phase detector; 703: frequency detector; 801: power control unit (power controller); 802: voltage adjustment unit (voltage adjuster); 803: switching unit (switch); 901: power reference calculation unit (power reference calculator); 902: phase control unit (phase controller); 903: frequency control unit (frequency controller); 904: threshold calculation unit (threshold calculator); 1001: subtractor; 1002; first PI block; 1003: proportional gain K_phase; 1101: subtractor; 1102: second PI block; 1103: proportional gain K_freq; 1201: Pref control unit (Pref control unit); 1202: addition circuit; 1301: third PI block; 1302: voltage signal unit; 1303: addition circuit; 1401: governor equation block; 1402: limiter; 1501: subtractor; 1502: integrator with gain 1/M; 1503: proportional gain Dg; 1504: dFvsg; 1505: addition circuit; 1506: proportional gain 2π; 1507: integrator; 101*a*~101*n*: multiple DER systems; 111*a*~111*n*: multiple distribution impedances; 1040: reconnection control apparatus; 1030: reconnection control unit (reconnection controller); 8010: power control unit (power controller); 9010: power reference calculation unit (power reference calculator); 9020: phase control unit (phase controller); 9030: frequency control unit (frequency controller); 9040: threshold calculation unit (threshold calculator); 2801: subtractor; 2802: fourth PI block; 1003*a*~1003*n*: proportional gain corresponding to DER systems; 2901: subtractor; 2902: fifth PI block; 1103*a*~1103*n*: proportional gain corresponding to DER systems.

The invention claimed is:

1. A reconnection control apparatus that controls a switch disposed between at least one DER system and a power grid comprising: the DER system having a droop characteristics that can control a phase and a frequency of an output voltage of the DER system based on a power reference signal received from the reconnection control apparatus, a first detector to detect a first phase and a first frequency of a voltage on a side of the DER system of the switch;

a second detector to detect a second phase and a second frequency of a voltage on a side of the power grid of the switch; and a reconnection controller to control the DER system by outputting the power reference signal to the DER system and reconnect the DER system to the power grid by outputting a switch signal to the switch, the reconnection controller controlling the DER system so that the first phase matches the second phase and the first frequency matches the second frequency, the reconnection controller outputting the switch signal when an absolute difference between the first phase detected by the first detector and the second phase detected by the second detector is less than a specific threshold.

2. The reconnection control apparatus according to claim 1, wherein the DER system has a power-frequency droop characteristics so that the frequency of the output voltage of the DER system depends on a difference between a power output of the DER system and the power reference signal provided by the reconnection controller.

3. The reconnection control apparatus according to claim 1, wherein the DER system further controls an amplitude of the output voltage of the DER system based on a voltage reference signal received from the reconnection control apparatus, the first detector detects a first amplitude of the voltage on the side of the DER system of the switch, the second detector detects a second amplitude of the voltage on the side of the power grid of the switch, the reconnection controller further controls the DER system by outputting the voltage reference signal to the DER system and reconnects the DER system to the power grid by outputting the switch signal to the switch, the reconnection controller controls the DER system so that the first amplitude matches the second amplitude and outputs the switch signal when an absolute difference between the first amplitude detected by the first detector and the second amplitude detected by the second detector is less than a specific threshold.

4. The reconnection control apparatus according to claim 3, wherein the reconnection controller includes:

a power controller that calculates the power reference signal based on the first phase, the second phase, the first frequency and the second frequency and output the power reference signal to the DER system; and a voltage adjuster that calculates the voltage reference signal based on the first amplitude and the second amplitude and output the voltage reference signal to the DER system.

5. The reconnection control apparatus according to claim 4, wherein the reconnection controller further includes a switch;

the power controller outputs a first signal based on an absolute difference between the first phase and the second phase, the voltage adjuster outputs a second signal based on an absolute difference between the first amplitude and the second amplitude, the switch outputs the switch signal to the switch to close the switch based on the first signal and the second signal.

6. The reconnection control apparatus according to claim 5, wherein the power controller includes:

a phase controller that generates a phase power reference based on a difference between the first phase and the second phase to control the first phase;

a frequency controller that generates a frequency power reference based on a difference between the first frequency and the second frequency to control the first frequency; and a power reference calculator that generates the power reference signal based on the phase power reference and the frequency power reference.

7. The reconnection control apparatus according to claim 6, wherein the power reference calculator calculates the power reference signal based on the phase power reference to match the first phase to the second phase when an absolute difference between the first phase and the second phase is more than or equal to a first threshold.

8. The reconnection control apparatus according to claim 6, wherein the at least one DER system has multiple DER systems, the phase controller generates multiple phase power references based on the difference between the first phase and the second phase and capacities of multiple DER systems to control the first phase, the frequency controller generates multiple frequency power references based on the difference between the first frequency and the second frequency and capacities of multiple DER systems to control the first frequency.

9. The reconnection control apparatus according to claim 7, wherein the power reference calculator calculates the power reference signal after a first condition is met or the second condition is met, the first condition being that the first frequency is less than the second frequency and the first phase is less than the second phase, the second condition being that the first frequency is more than or equal to the second frequency and the first phase is more than the second phase.

10. The reconnection control apparatus according to claim 9, wherein the power reference calculator calculates the power reference signal based on the frequency power reference to match the first frequency to the second frequency when the absolute difference between the first phase and the second phase is less than the first threshold.

11. The reconnection control apparatus according to claim 10, wherein the power reference calculator outputs the first signal when the absolute difference between the first phase and the second phase is less than a second threshold, the second threshold being less than the first threshold.

12. The reconnection control apparatus according to claim 7, wherein the voltage adjuster calculates the voltage reference signal based on a difference between the first amplitude and the second amplitude to match the first amplitude to the second amplitude when an absolute difference between the first amplitude and the second amplitude is more than or equal to a third threshold.

13. The reconnection control apparatus according to claim 12, wherein the voltage adjuster outputs the second signal when the absolute difference between the first amplitude and the second amplitude is less than the third threshold.

14. The reconnection control apparatus according to claim 1, wherein the at least one DER system has multiple DER systems, the reconnection controller outputs multiple power reference signals to the multiple DER systems respectively.

15. A power system comprising:

the reconnection control apparatus according to claim 1 accompanying at least one DET system, a switch; and a power grid; wherein the DER system includes:

a DC source;

an inverter connected to the DC source; and an inverter controller that controls the inverter based on the power reference signal, the voltage signal and the output of the inverter;

the inverter controller includes:

a first subtractor that calculates a difference between a frequency of an output voltage of the inverter and a frequency reference signal;

a governor controller that receives an output of the first subtractor and implements a governor control;

an addition circuit that adds the power reference signal and an output of the governor controller;

a second subtractor that calculates a difference between an output of the addition circuit and an output power of the inverter; and a main VSG controller that implements an inertial behavior through a swing equation to simulate synchronous generator characteristics of the inverter.

* * * * *